United States Patent
Ogawa et al.

(10) Patent No.: US 11,134,024 B2
(45) Date of Patent: Sep. 28, 2021

(54) COMMUNICATION CONTROL DEVICE, SWITCHING DEVICE, OUT-OF VEHICLE COMMUNICATION DEVICE, COMMUNICATION CONTROL METHOD AND COMMUNICATION CONTROL PROGRAM

(71) Applicants: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihiro Ogawa, Osaka (JP); Akihito Iwata, Osaka (JP); Hirofumi Urayama, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

(*) Notice: Subject to any disclaimer, the term of this patent is extended or adjusted under 35 U.S.C. 154(b) by 7 days.

(21) Appl. No.: 16/344,436

(22) PCT Filed: Aug. 2, 2017

(86) PCT No.: PCT/JP2017/028020
§ 371 (c)(1),
(2) Date: Apr. 24, 2019

(87) PCT Pub. No.: WO2018/079000
PCT Pub. Date: May 3, 2018

(65) Prior Publication Data
US 2020/0059438 A1    Feb. 20, 2020

(30) Foreign Application Priority Data

Oct. 25, 2016  (JP) .............................. JP2016-208705

(51) Int. Cl.
*H04L 12/911* (2013.01)
*H04L 12/835* (2013.01)
(Continued)

(52) U.S. Cl.
CPC .............. *H04L 47/74* (2013.01); *H04L 47/10* (2013.01); *H04L 47/30* (2013.01); *H04L 47/50* (2013.01);
(Continued)

(58) Field of Classification Search
None
See application file for complete search history.

(56) References Cited

U.S. PATENT DOCUMENTS 6,018,515 A * 1/2000 Sorber ................ H04Q 3/0025
370/229
8,248,945 B1   8/2012 Sathe et al.
(Continued)

FOREIGN PATENT DOCUMENTS

JP    2009-171305 A    7/2009
JP    2012-244524 A    12/2012
(Continued)

*Primary Examiner* — Jutai Kao
(74) *Attorney, Agent, or Firm* — Baker Botts L.L.P.; Michael A. Sartori

(57) ABSTRACT

A communication control device used in an on-vehicle communication system including an out-of-vehicle communication device being one of a plurality of function units provided in a vehicle and being capable of communicating with an external device outside the vehicle, and a switching device being capable of relaying communication data from one of the function units to another one of the function units, comprises: an acquisition unit that acquires status informa- (Continued)

tion indicating a status of a queue for storing in the switching device at least communication data from the out-of-vehicle communication device; and a control unit that determines restriction of transmission of communication data from the external device to the out-of-vehicle communication device based on the status information acquired by the acquisition unit.

12 Claims, 11 Drawing Sheets

(51) Int. Cl.
  *H04L 12/801* (2013.01)
  *H04L 12/40* (2006.01)
  *H04L 12/863* (2013.01)
  *H04W 28/10* (2009.01)

(52) U.S. Cl.
  CPC .............. *H04L 2012/40215* (2013.01); *H04L 2012/40273* (2013.01); *H04W 28/10* (2013.01)

(56) References Cited

U.S. PATENT DOCUMENTS

| | | | |
|---|---|---|---|
| 9,319,334 B2* | 4/2016 | Matsuike | H04L 47/26 |
| 2010/0097924 A1* | 4/2010 | Yamaguchi | H04W 28/021 |
| | | | 370/216 |
| 2010/0265861 A1* | 10/2010 | He | H04L 47/14 |
| | | | 370/311 |
| 2014/0215491 A1 | 7/2014 | Addepalli et al. | |
| 2014/0355435 A1 | 12/2014 | Umezuki | |
| 2015/0256468 A1 | 9/2015 | Hiramoto et al. | |
| 2017/0270305 A1* | 9/2017 | Kodama | G06F 21/60 |
| 2018/0007581 A1* | 1/2018 | Cariou | H04L 47/30 |
| 2018/0069800 A1 | 3/2018 | Stahlin et al. | |

FOREIGN PATENT DOCUMENTS

| | | |
|---|---|---|
| JP | 2013-106203 A | 5/2013 |
| JP | 2013-168865 A | 8/2013 |
| JP | 2014-233028 A | 12/2014 |
| JP | 2015-170948 A | 9/2015 |
| WO | 2016/166230 A1 | 10/2016 |

* cited by examiner

COMMUNICATION CONTROL DEVICE, SWITCHING DEVICE, OUT-OF VEHICLE COMMUNICATION DEVICE, COMMUNICATION CONTROL METHOD AND COMMUNICATION CONTROL PROGRAM

FIELD

The present invention relates to a communication control device, a switching device, an out-of-vehicle communication device, a communication control method and a communication control program.

The present application is the national phase under 35 U.S.C. § 371 of PCT International Application No. PCT/JP2017/028020 which has an International filing date of Aug. 2, 2017 and designated the United States of America.

The present application claims the benefit of Japanese Patent Application No. 2016-208705 filed on Oct. 25, 2016, the entire contents of which are herein incorporated by reference.

BACKGROUND

Patent Document 1 (Japanese Patent Application Laid-Open No. 2013-168865) discloses an on-vehicle network system as described below. The on-vehicle network system comprises an on-vehicle control device provided with a memory for storing definition data that defines a portion which is based on implementation on an on-vehicle network among communication protocols used on the on-vehicle network, and a communication protocol issue device configured to issue the definition data to the on-vehicle control device. When receiving a registration request that requests to allow the on-vehicle control device to participate in the on-vehicle network from a registration device for allowing the on-vehicle control device to participate in the on-vehicle network, after authenticating the registration device, the communication protocol issue device generates the definition data based on implementation on the on-vehicle network and returns the definition data to the registration device. The registration device receives the definition data transmitted from the communication protocol issue device and requests the on-vehicle control device to store the received definition data in the memory. The on-vehicle control device receives the definition data from the registration device, stores the definition data in the memory, and communicates using the on-vehicle network in conformity with the communication protocol according to the portion defined by the definition data.

SUMMARY

A communication control device according to the present disclosure is a communication control device used in an on-vehicle communication system including an out-of-vehicle communication device being one of a plurality of function units provided in a vehicle and being capable of communicating with an external device outside the vehicle, and a switching device being capable of relaying communication data from one of the function units to another one of the function units, comprising: an acquisition unit that acquires status information indicating a status of a queue for storing in the switching device at least communication data from the out-of-vehicle communication device; and a control unit that determines restriction of transmission of communication data from the external device to the out-of-vehicle communication device based on the status information acquired by the acquisition unit.

A switching device according to the present disclosure comprises a switching unit that performs relay processing for relaying communication data from one of a plurality of function units provided in a vehicle to another one of the function units; one or a plurality of queues storing the communication data; an acquisition unit that acquires status information indicating a status of the queue for storing at least communication data from an out-of-vehicle communication device being one of the function units and being capable of communicating with an external device outside the vehicle; and a control unit that determines restriction of transmission of communication data from the external device to the out-of-vehicle communication device based on the status information acquired ty the acquisition unit.

An out-of-vehicle communication device according to the present disclosure being one of a plurality of function units provided in a vehicle and being capable of communicating with an external device outside the vehicle, comprises: an acquisition unit that acquires status information indicating a status of a queue for storing at least communication data from the out-of-vehicle communication device in a switching device being capable of relaying communication data from one of the function units to another one of the function units; and a control unit that determines restriction of transmission of communication data from the external device to the out-of-vehicle communication device based on the status information acquired by the acquisition unit.

A communication control method according to the present disclosure is a communication control method for a communication control device used in an on-vehicle communication system including an out-of-vehicle communication device being one of a plurality of function units provided in a vehicle and being capable of communicating with an external device outside the vehicle and a switching device capable of relaying communication data from one of the function units to another one of the function units, comprising: acquiring status information indicating a status of a queue for storing in the switching device at least communication data from the out-of-vehicle communication device; and determining restriction of transmission of communication data from the external device to the out-of-vehicle communication device based on the acquired status information.

A communication control method according to the present disclosure is a communication control method for a switching device including a switching unit performing relay processing for relaying communication data from one of a plurality of function units provided in a vehicle to another one of the function units and one or a plurality of queues storing the communication data, comprising: acquiring status information indicating a status of the queue for storing at least communication data from an out-of-vehicle communication device being one of the function units and being capable of communicating with an external device outside the vehicle; and determining restriction of transmission of communication data from the external device to the out-of-vehicle communication device based on the acquired status information.

A communication control method according to the present disclosure is a communication control method for an out-of-vehicle communication device being one of a plurality of function units provided in a vehicle and being capable of communicating with an external device outside the vehicle, comprising: acquiring status information indicating a status of a queue for storing at least communication data from the out-of-vehicle communication device in a switching device being capable of relaying communication data from one of the function units to another one of the function units; and determining restriction of transmission of communication data from the external device to the out-of-vehicle communication device based on the acquired status information.

A communication control program according to the present disclosure is a communication control program used for a communication control device used in an on-vehicle communication system including an out-of-vehicle communication device being one of a plurality of function units provided in a vehicle and being capable of communicating with an external device outside the vehicle, and a switching device being capable of relaying communication data from one of the function units to another one of the function units, causing a computer to function as: an acquisition unit that acquires status information indicating a status of a queue for storing in the switching device at least communication data from the out-of-vehicle communication device; and a control unit that determines restriction of transmission of communication data from the external device to the out-of-vehicle communication device based on the status information acquired by the acquisition unit.

A communication control program according to the present disclosure is a communication control program used for a switching device, causing a computer to function as: a switching unit that performs relay processing for relaying communication data from one of a plurality of function units provided in a vehicle to another one of the function units; one or a plurality of queues storing the communication data; an acquisition unit that acquires status information indicating a status of the queue for storing at least communication data from an out-of-vehicle communication device being one of the function units and being capable of communicating with an external device outside the vehicle; and a control unit that determines restriction of transmission of communication data from the external device to the out-of-vehicle communication device based on the status information acquired by the acquisition unit.

A communication control program according to the present disclosure is a communication control program used for an out-of-vehicle communication device being one of a plurality of function units provided in a vehicle and being capable of communicating with an external device outside the vehicle, causing a computer to function as: an acquisition unit that acquires status information indicating a status of a queue for storing at least communication data from the out-of-vehicle communication device in a switching device being capable of relaying communication data from one of the function units to another one of the function units, and a control unit that determines restriction of transmission of communication data from the external device to the out-of-vehicle communication device based on the status information acquired by the acquisition unit.

One aspect of the present disclosure may be achieved not only as a communication control device having such a characteristic processing unit but also as an on-vehicle communication system including the communication control device. Furthermore, one aspect of the present disclosure may also be achieved as a semiconductor integrated circuit implementing a part or all of the communication control device.

One aspect of the present disclosure may be achieved not only as a switching device having such a characteristic processing unit but also as an on-vehicle communication system including the switching device. Furthermore, one aspect of the present disclosure may be achieved as a semiconductor integrated circuit implementing a part or all of the switching device.

One aspect of the present disclosure may be achieved not only as an out-of-vehicle communication device having such a characteristic processing unit but also as an on-vehicle communication system including the out-of-vehicle communication device. Furthermore, one aspect of the present disclosure may be achieved as a semiconductor integrated circuit implementing a part or all of the out-of-vehicle communication device.

The above and further objects and features will more fully be apparent from the following detailed description with accompanying drawings.

DETAILED DESCRIPTION

Figure 1:
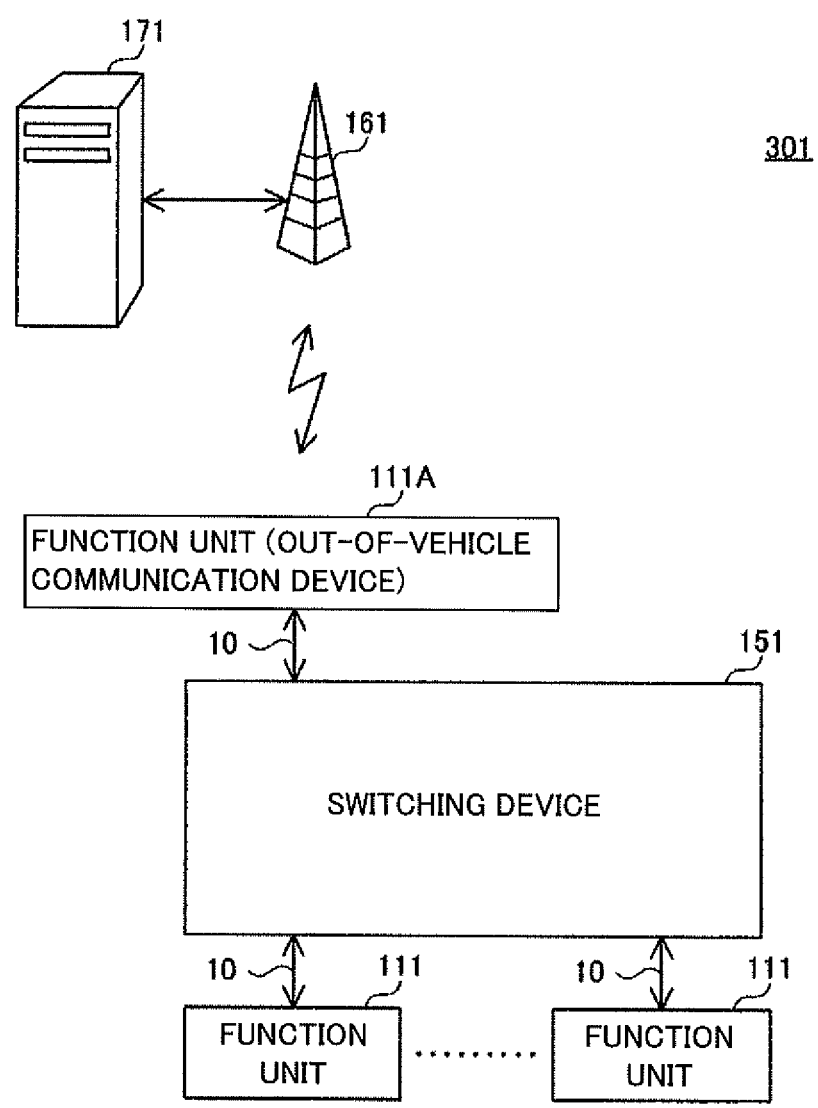
FIG. 1 illustrates an example of the configuration of an on-vehicle communication system according to Embodiment 1 of the present invention.

Conventionally, an on-vehicle network system for enhancing security in an on-vehicle network has been developed.

In the case where an on-vehicle network system as described in Patent Document 1 is connected to an external network outside the vehicle, an out-of-vehicle communication device for communicating with the external network may be provided in the vehicle. In the case where the out-of-vehicle communication device transmits information received from the external network to a target device in the on-vehicle network, if there is not enough free space in a buffer of the target device, the target device may discard information that is unable to be stored in the buffer any longer. In such a case, the out-of-vehicle communication device transmits the information again, thereby degrading information transmission efficiency.

The present disclosure is made to solve the above-described problem, and the object is to provide a communication control device capable of efficiently transmitting information from the outside of the vehicle to the on-vehicle network, a switching device, an out-of-vehicle communication device, a communication control method and a communication control program.

According to the present disclosure, it is possible to efficiently transmit information from the outside of the vehicle to the on-vehicle network.

Embodiments of the present invention are first listed and described.

The communication control device according to an embodiment of the present invention is a communication control device used in an on-vehicle communication system including an out-of-vehicle communication device being one of a plurality of function units provided in a vehicle and being capable of communicating with an external device outside the vehicle, and a switching device being capable of relaying communication data from one of the function units to another one of the function units, comprising: an acquisition unit that acquires status information indicating a status of a queue for storing in the switching device at least communication data from the out-of-vehicle communication device; and a control unit that determines restriction of transmission of communication data from the external device to the out-of-vehicle communication device based on the status information acquired by the acquisition unit.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

Preferably, the status of the queue includes at least any one of a free status in the queue, and a loss rate and a throughput of communication data to be stored in the queue.

According to such a configuration, a communication data amount that can be stored in the queues, a success rate of the relay processing of the communication data stored in the queues and a transmission speed of the communication data stored in the queues can be acquired. It is thus possible to correctly determine whether or not the communication data can be transmitted to the function unit of the transmission destination so as not to cause the communication data to overflow the queues.

More preferably, the status of the queue includes a predicted value of the status.

According to such a configuration, a future storable communication data amount in the queues, a future success rate of the relay processing of the communication data stored in the queues and a future transmission speed of the communication data stored in the queues can be acquired. It is thus possible to earlier determine whether or not the communication data can be transmitted to the function unit being the transmission destination so as not to cause the communication data to overflow the queues.

Preferably, the acquisition unit further acquires transmission information concerning transmission of communication data from the external device to the out-of-vehicle communication device, and the control unit determines the restriction based on the status information and the transmission information that are acquired by the acquisition unit.

According to such a configuration, it is possible to determine the restriction of the transmission of the communication data in view of the speed of the communication between the external device and the out-of-vehicle communication device and an allowable delay time of the communication data to be transmitted by the external device, for example.

The switching device according to an embodiment of the present invention comprises a switching unit that performs relay processing for relaying communication data from one of a plurality of function units provided in a vehicle to another one of the function units; one or a plurality of queues storing the communication data; an acquisition unit that acquires status information indicating a status of the queue for storing at least communication data from an out-of-vehicle communication device being one of the function units and being capable of communicating with an external device outside the vehicle; and a control unit that determines restriction of transmission of communication data from the external device to the out-of-vehicle communication device based on the status information acquired by the acquisition unit.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

Preferably, the status of the queue includes transmittability of communication data to be stored in the queue.

According to such a configuration, it is possible to easily and correctly recognize whether the communication data transmitted from the out-of-vehicle communication device overflows the queues or not.

The out-of-vehicle communication device according to an embodiment of the present invention being one of a plurality of function units provided in a vehicle and being capable of communicating with an external device outside the vehicle, comprises: an acquisition unit that acquires status information indicating a status of a queue for storing at least communication data from the out-of-vehicle communication device in a switching device being capable of relaying communication data from one of the function units to another one of the function units; and a control unit that determines restriction of transmission of communication data from the external device to the out-of-vehicle communication device based on the status information acquired by the acquisition unit.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

The communication control method according to an embodiment of the present invention is a communication control method for a communication control device used in an on-vehicle communication system including an out-of-vehicle communication device being one of a plurality of function units provided in a vehicle and being capable of communicating with an external device outside the vehicle and a switching device capable of relaying communication data from one of the function units to another one of the function units, comprising: acquiring status information indicating a status of a queue for storing in the switching device at least communication data from the out-of-vehicle communication device; and determining restriction of transmission of communication data from the external device to the out-of-vehicle communication device based on the acquired status information.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

The communication control method according to an embodiment of the present invention is a communication control method for a switching device including a switching unit performing relay processing for relaying communication data from one of a plurality of function units provided in a vehicle to another one of the function units and one or a plurality of queues storing the communication data, comprising: acquiring status information indicating a status of the queue for storing at least communication data from an out-of-vehicle communication device being one of the function units and being capable of communicating with an external device outside the vehicle; and determining restriction of transmission of communication data from the external device to the out-of-vehicle communication device based on the acquired status information.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

The communication control method according to an embodiment of the present invention is a communication control method for an out-of-vehicle communication device being one of a plurality of function units provided in a vehicle and being capable of communicating with an external device outside the vehicle, comprising: acquiring status information indicating a status of a queue for storing at least communication data from the out-of-vehicle communication device in a switching device being capable of relaying communication data from one of the function units to another one of the function units; and determining restriction of transmission of communication data from the external device to the out-of-vehicle communication device based on the acquired status information.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

The communication control program according to an embodiment of the present invention is a communication control program used for a communication control device used in an on-vehicle communication system including an out-of-vehicle communication device being one of a plurality of function units provided in a vehicle and being capable of communicating with an external device outside the vehicle, and a switching device being capable of relaying communication data from one of the function units to another one of the function units, the program causing a computer to function as: an acquisition unit that acquires status information indicating a status of a queue for storing in the switching device at least communication data from the out-of-vehicle communication device; and a control unit that determines restriction of transmission of communication data from the external device to the out-of-vehicle communication device based on the status information acquired by the acquisition unit.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

The communication control program according to an embodiment of the present invention is a communication control program used for a switching device, causing a computer to function as: a switching unit that performs relay processing for relaying communication data from one of a plurality of function units provided in a vehicle to another one of the function units; one or a plurality of queues storing the communication data; an acquisition unit that acquires status information indicating a status of the queue for storing at least communication data from an out-of-vehicle communication device being one of the function units and being capable of communicating with an external device outside the vehicle; and a control unit that determines restriction of transmission of communication data from the external device to the out-of-vehicle communication device based on the status information acquired by the acquisition unit.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

A communication control program according to embodiment of the present invention is a communication control program used for an out-of-vehicle communication device being one of a plurality of function units provided in a vehicle and being capable of communicating with an external device outside the vehicle, causing a computer to function as: an acquisition unit that acquires status information indicating a status of a queue for storing at least communication data from the out-of-vehicle communication device in a switching device being capable of relaying communication data from one of the function units to another one of the function units, and a control unit that determines restriction of transmission of communication data from the external device to the out-of-vehicle communication device based on the status information acquired by the acquisition unit.

According to such a configuration, it is possible to determine, based on the status information, for example, whether or not the communication data can be transmitted to the function unit being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

The embodiments of the present invention will be described below with reference to the drawings thereof. It is noted that the same or corresponding parts are denoted by the same reference codes in the drawings to avoid repetitive descriptions. Furthermore, at least parts of the embodiments described below may arbitrarily be combined.

Embodiment 1

[Configuration and Basic Operation]

FIG. 1 illustrates an example of the configuration of an on-vehicle communication system according to Embodiment 1 of the present invention.

Referring to FIG. 1, an on-vehicle communication system 301 includes an out-of-vehicle communication device 111A and a switching device 151.

The on-vehicle communication system 301 is mounted on a vehicle. The vehicle is provided with multiple function units 111.

The switching device 151 is connected to the multiple function units 111 through Ethernet cables 10, for example, and is able to communicate with the multiple function units 111 connected to the device itself. The switching device 151 and each of the function units 111 exchange information by using an Ethernet (registered trademark) frame, for example.

The out-of-vehicle communication device 111A is one of the function units 111 and is able to communicate with an external device outside the vehicle.

More specifically, the out-of-vehicle communication device 111A is a telematics communication unit (TCU), for example, and is able to wirelessly communicate with a radio base station device 161 in compliance with a communication standard such as long term evolution (LTE), 3G or the like.

The out-of-vehicle communication device 111A is able to communicate with a server 171, which is one example of the external device, via the radio base station device 161.

Figure 2:
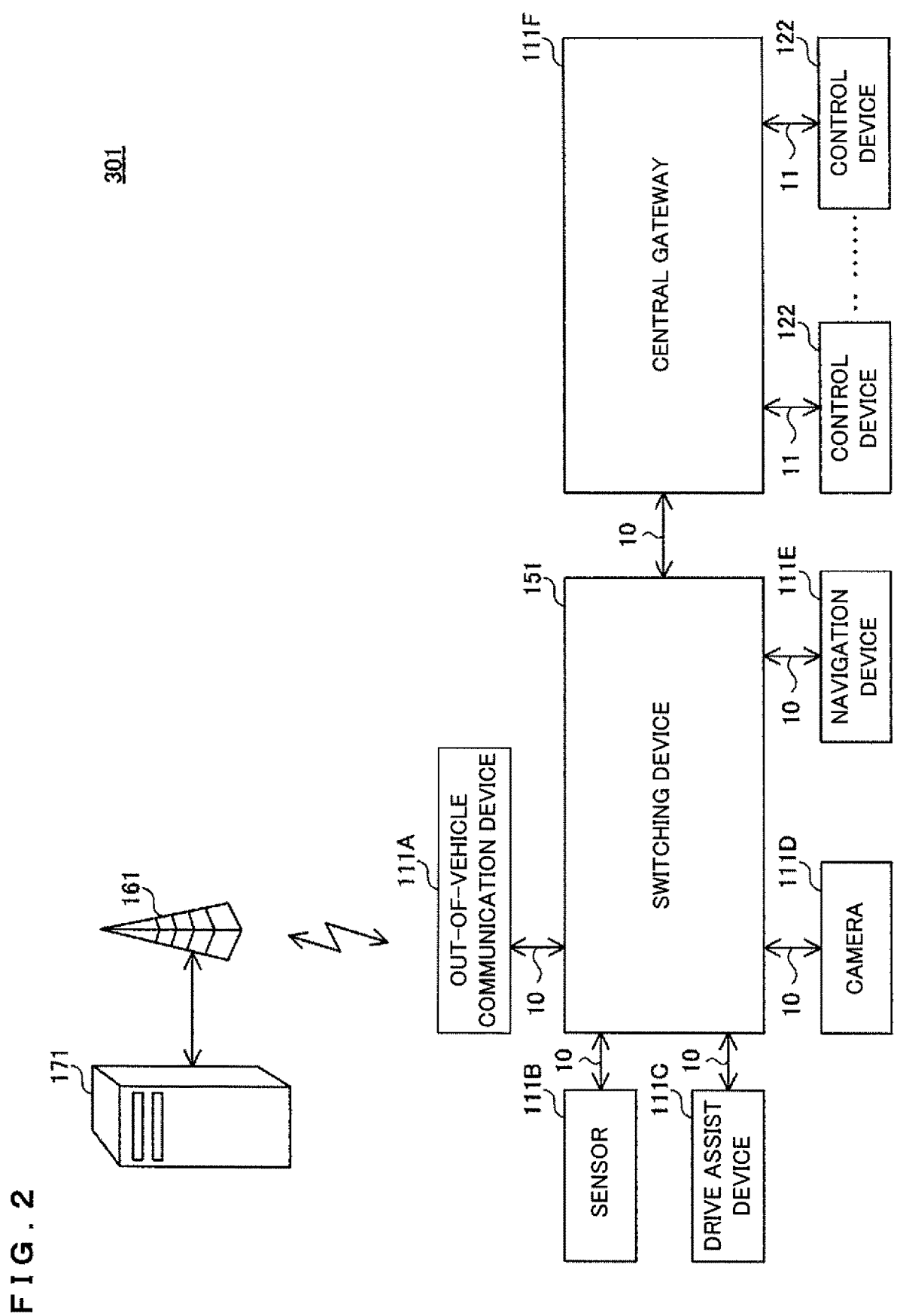
FIG. 2 illustrates an application example of the on-vehicle communication system according to Embodiment 1 of the present invention.

FIG. 2 illustrates an application example of the on-vehicle communication system according to Embodiment 1 of the present invention.

Referring to FIG. 2, in the application example of the on-vehicle communication system 301, the switching device 151 is connected to, for example, the out-of-vehicle communication device 111A, a sensor 111B, a drive assist device 111C, a camera 111D, a navigation device 111E and a central gateway 111F through the Ethernet cables 10.

Here, the sensor 111B, the drive assist device 111C, the camera 111D, the navigation device 111E and the central gateway 111F are examples of the function units 111.

The switching device 151 transmits an Ethernet frame received from one function unit 111 to another function unit 111 corresponding to its destination.

More specifically, the switching device 151 transmits the Ethernet frame to the function unit 111 of the destination based on a transmission source media access control (MAC) address and a destination MAC address that are included in the received Ethernet frame.

Examples of a control device 122 are an engine control device, an automatic transmission (AT) control device, a hybrid electric vehicle (HEV) control device, a brake control device, a chassis control device, a steering control device, a meter display control device, and so on.

The central gateway 111F is connected to each of the control devices 122 via a CAN bus 11 in compliance with a controller area network (CAN) (registered trademark), for example.

The central gateway 111F performs relay processing of information exchanged among the control devices 122 that are connected to different CAN buses 11, and performs relay processing of information exchanged among the switching device 151 and the control device 122.

The sensor 111B is a laser radar, for example, and periodically detects an object around the vehicle and creates an Ethernet frame including sensor information indicating the detection result. The sensor 111B sets the destination MAC address of the created Ethernet frame to the MAC address of the drive assist device 111C and then transmits the Ethernet frame to the drive assist device 111C via the switching device 151.

The camera 111D periodically photographs an object around the vehicle, for example, and creates an Ethernet frame including camera information indicating the photographing result. The camera 111D sets the destination MAC address of the created Ethernet frame to the MAC address of the drive assist device 111C and then transmits the Ethernet frame to the drive assist device 111C via the switching device 151.

The navigation device 111E periodically transmits a video information request for requesting video information indicating contents, etc. to the server 171 via the switching device 151 and the out-of-vehicle communication device 111A.

When receiving the video information request from the navigation device 111E, the server 171 transmits an IP packet including the video information to the out-of-vehicle communication device 111A via the radio base station device 161 according to the received video information request.

When receiving the IP packet from the server 171, the out-of-vehicle communication device 111A stores the received IP packet in the Ethernet frame and transmits it to the navigation device 111E via the switching device 151.

Figure 3:
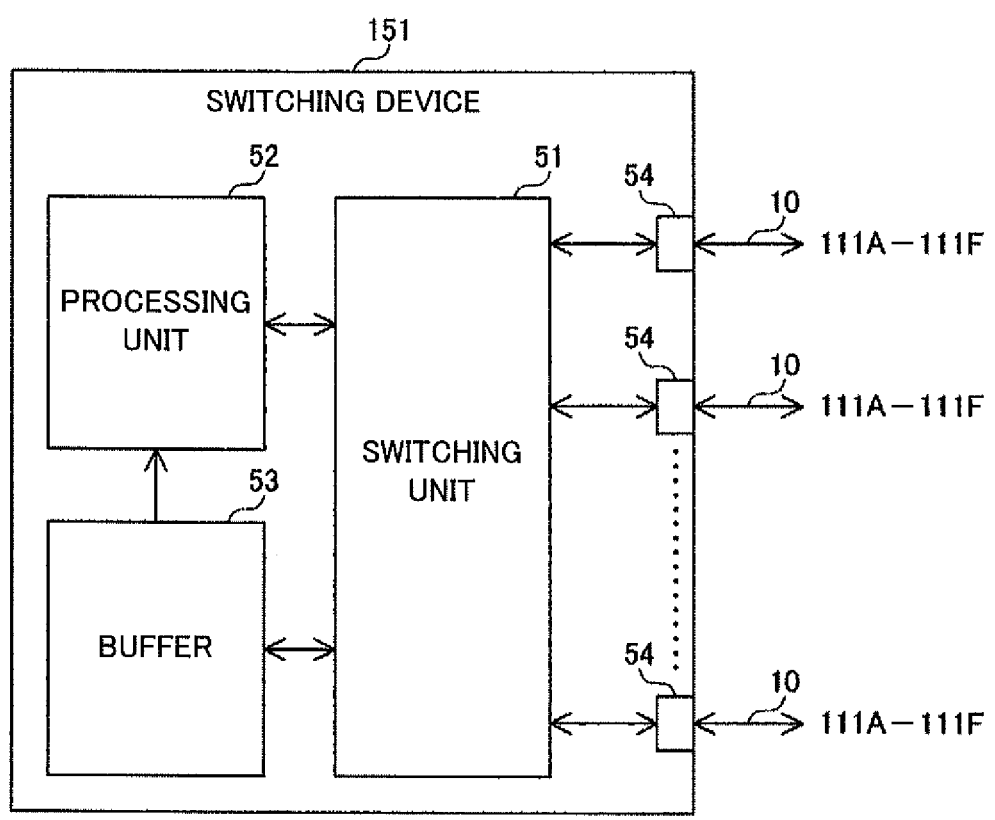
FIG. 3 illustrates an example of the configuration of a switching device in the on-vehicle communication system according to Embodiment 1 of the present invention.

FIG. 3 illustrates an example of the configuration of a switching device in the on-vehicle communication system according to Embodiment 1 of the present invention.

Referring to FIG. 3, the switching device 151 includes a switching unit 51, a processing unit 52, a buffer 53 and multiple communication ports 54.

Each of the communication ports 54 of the switching device 151 is a terminal to which an Ethernet cable 10, for example, can be connected. Note that the communication port 54 may be a terminal of an integrated circuit.

Each of the multiple communication ports 54 is connected to any one of the multiple function units 111 via the Ethernet cable 10.

The multiple communication ports 54 are also associated with a virtual local area network (VLAN). More specifically, the sensor 111B, the drive assist device 111C, the camera 111D, the navigation device 111E and the central gateway 111F belong to VLAN1. Furthermore, the out-of-vehicle communication device 111A belongs to VLAN2 different from VLAN1.

The switching unit 51 is a layer 2 (L2) switch, for example, and holds a VLAN table depicting correspondences between the port numbers of the communication ports 54 and VLANs.

Furthermore, the switching unit 51 holds a connection table depicting correspondences between the port numbers of the communication ports 54 and the MAC addresses of the function units 111 connected via the respective communication ports 54, for example.

In addition, the switching unit 51 holds, for example, a priority table for designating the priority of the information to be relayed. More specifically, the priority table depicts, for example, the correspondences between communication paths and priorities, and is set by the user. The communication path is defined by, for example, a transmission source MAC address and a destination MAC address.

More specifically, a communication path P1 passing from the sensor 111B to the drive assist device 111C, for example, is assigned with the highest priority. A communication path P2 passing from the camera 111D to the drive assist device 111C, for example, is assigned with the second highest priority. A communication path PN passing from the out-of-vehicle communication device 111A to the navigation device 111E, for example, is assigned with the lowest priority.

Figure 4:
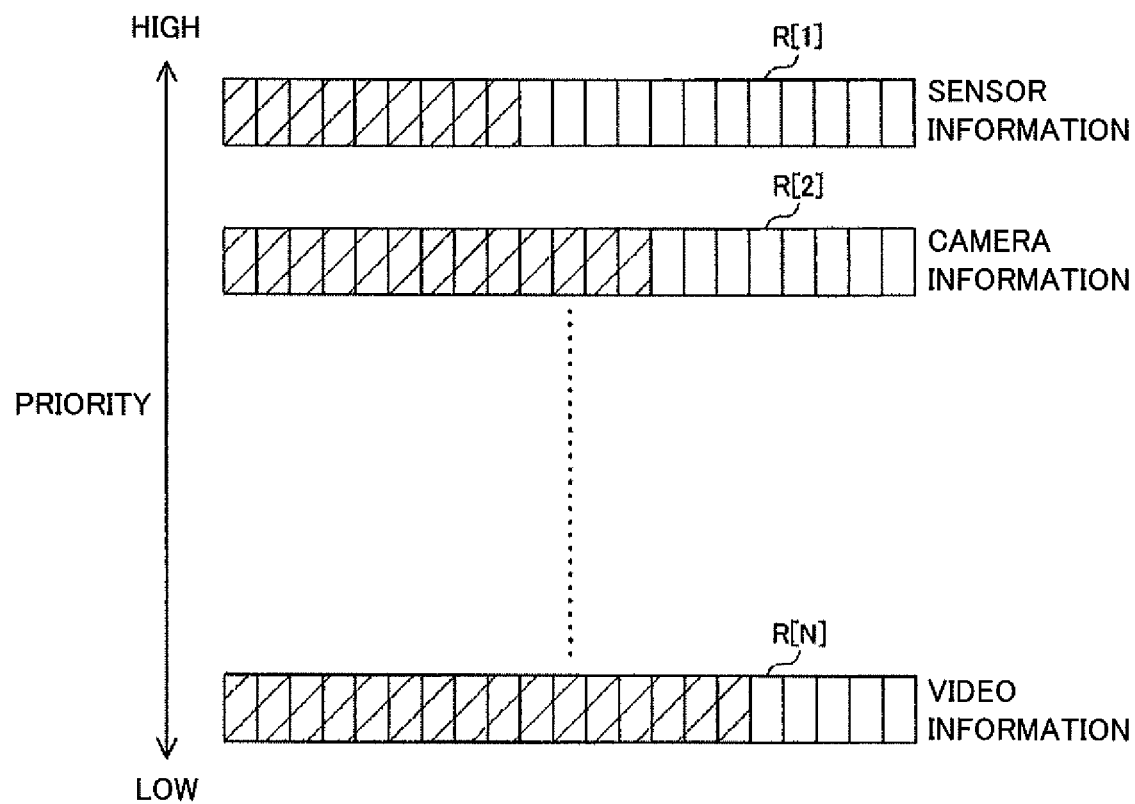
FIG. 4 illustrates an example of a storage format of communication data in a buffer according to Embodiment 1 of the present invention.

FIG. 4 illustrates an example of a storage format of communication data in a buffer according to Embodiment 1 of the present invention.

Referring to FIG. 4, the buffer 53 is provided with multiple queues for storing communication data. In one of the multiple queues, communication data from the out-of-vehicle communication device 111A, for example, is stored.

More specifically, the buffer 53 is provided with N regions R[n] (where n is an integer from 1 to N) in correspondence with the priority as one example of the multiple queues. In the region with smaller n, communication data of higher priority is stored. In other words, in the region with lager n, communication data of lower priority is stored.

The switching unit 51 performs relay processing for relaying communication data from one function unit 111 to another function unit 111.

More specifically, when receiving an Ethernet frame from, for example, the sensor 111B, the switching unit 51 specifies a communication path P1 based on the transmission source MAC address and the destination MAC address of the received Ethernet frame.

The switching unit 51 recognizes that the priority of the received Ethernet frame is the highest based on the specified communication path P1 and the priority table, and stores this Ethernet frame in the region R[1].

Likewise, when receiving an Ethernet frame from, for example, the camera 111D, the switching unit 51 specifies a communication path P2 based on the transmission source MAC address and the destination MAC address of the received Ethernet frame.

The switching unit 51 recognizes that the priority of the received Ethernet frame is the second highest based on the specified communication path P2 and the priority table, and stores this Ethernet frame in the region R[2].

Furthermore, when receiving an Ethernet frame transmitted among the function units 11 which belong to different VLANs, for example, the switching unit 51 acquires a transmission destination IP address from an IP packet stored in the received Ethernet frame and outputs the acquired transmission destination IP address to the processing unit 52.

Concretely, when receiving an Ethernet frame to be transmitted to, for example, the navigation device 111E from the out-of-vehicle communication device 111A, the switching unit 51 acquires a transmission destination IP address from the received Ethernet frame and outputs the acquired transmission destination IP address to the processing unit 52.

The processing unit 52 controls the relay processing performed by the switching unit 51 by performing layer 3 (L3) routing or layer 4 (L4) routing, for example.

More specifically, the processing unit 52 holds a routing table showing correspondences between port numbers of the communication ports 54 and IP addresses corresponding to the port numbers.

When receiving the transmission destination IP address from the switching unit 51, for example, the processing unit 52 acquires a port number corresponding to the received transmission destination IP address from the routing table and outputs the acquired port number to the switching unit 51.

When receiving the port number from the processing unit 52, the switching unit 51 acquires an MAC address corresponding to the received port number from the connection table.

The switching unit 51 specifies a communication path PN from the MAC address of the out-of-vehicle communication device 111A which is the transmission source and the MAC address acquired from the connection table, that is, the MAC address of the navigation device 111E.

The switching unit 51 recognizes that the priority of the Ethernet frame transmitted from the out-of-vehicle communication device 11A is the lowest based on the specified communication path PN and the priority table, and stores this Ethernet frame in the region R[N].

The switching unit 51 preferentially transmits out of the Ethernet frames stored in the buffer 53 the Ethernet frame stored in the region with higher priority to the function unit 11 of the destination.

More specifically, the switching unit 51 confirms whether or not an Ethernet frame is stored in the region R[1], for example, and if an Ethernet frame is stored, a destination MAC address is acquired from this Ethernet frame. The switching unit 51 then acquires a port number corresponding to the acquired destination MAC address from the connection table and transmits this Ethernet frame to the function unit 11 of the destination via the connection port 54 with the acquired port number.

If, on the other hand, an Ethernet frame is not stored in the region R[1], for example, processing as to the region R[1] is ended.

The switching unit 51 also performs processing similar to that performed on the region R[1] on the regions R[2]-R[N].

Hence, an Ethernet frame stored in the region with higher priority is preferentially transmitted to the function unit 111 of the destination.

The switching unit 51 is further provided with, for example, a transmission counter and a reception counter respectively counting the number of transmitted Ethernet frames and the number of received Ethernet frames for each communication port 54.

Moreover, the switching unit 51 measures, for example, a throughput of an Ethernet frame to be transmitted (hereinafter also referred to as a transmission throughput) and a throughput of an Ethernet frame to be received (hereinafter also referred to as a reception throughput) for each VLAN.

[Problems]

If an Ethernet frame is newly transmitted from the out-of-vehicle communication device 111A in a state where there is not enough free space in the region R[N], the switching unit 51 may not store the Ethernet frame received from the out-of-vehicle communication device 111A in the region R[N]. In such a case, the switching unit 51, for example, may discard this Ethernet frame.

When such discard of an Ethernet frame occurs, the out-of-vehicle communication device 111A transmits the Ethernet frame again, thereby degrading information transmission efficiency.

The on-vehicle communication system according to the embodiments of the present invention here solves such problems by taking the following configuration and operation.

Figure 5:
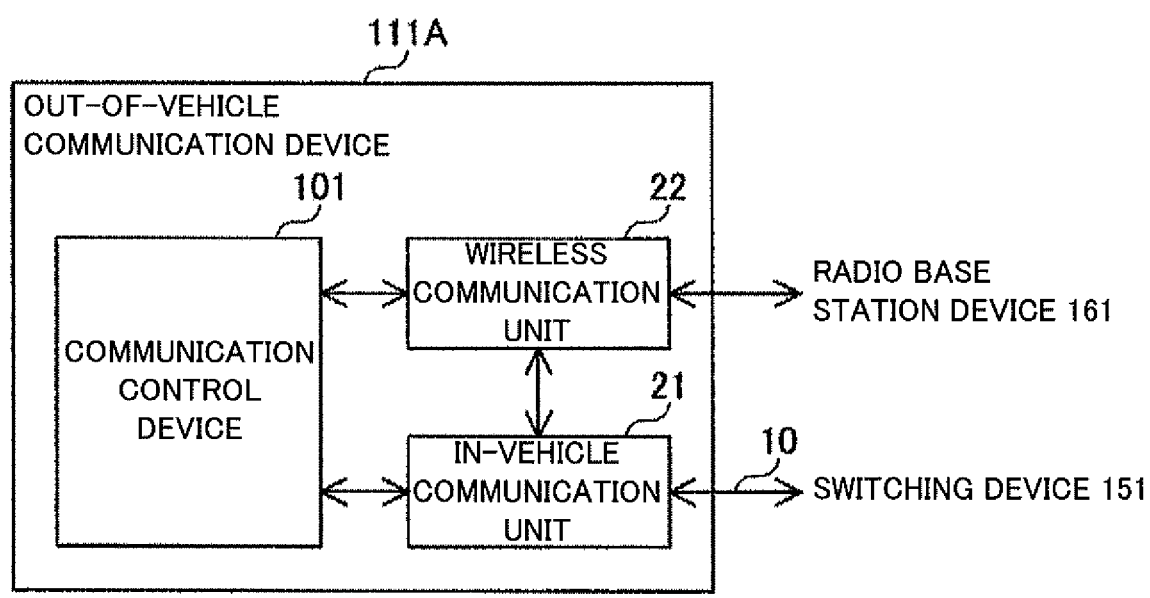
FIG. 5 illustrates an example of the configuration of an out-of-vehicle communication device in the on-vehicle communication system according to Embodiment 1 of the present invention.

FIG. 5 illustrates an example of the configuration of an out-of-vehicle communication device in the on-vehicle communication system according to Embodiment 1 of the present invention.

Referring to FIG. 5, the out-of-vehicle communication device 111A is provided with an in-vehicle communication unit 21, a wireless communication unit 22 and a communication control device 101.

Referring to FIG. 5, the wireless communication unit 22 of the out-of-vehicle communication device 111A can wirelessly communicate with the radio base station device 161. More specifically, the wireless communication unit 22 can communicate with an external device, for example, the server 171 via the radio base station device 161.

Note that the out-of-vehicle communication device 111A may be configured to include a wired communication unit performing wired communication with the external device, not limited to include the wireless communication unit 22 that performs wireless communication with the external device.

When receiving an IP packet from the server 171 via the radio base station device 161, the wireless communication unit 22, for example, outputs the received IP packet to the in-vehicle communication unit 21.

The in-vehicle communication unit 21 can communicate with the switching device 151 via the Ethernet cable 10.

When receiving an IP packet from the wireless communication unit 22, for example, the in-vehicle communication unit 21 stores the received IP packet in the Ethernet frame and transmits the Ethernet frame to the switching device 151.

Figure 6:
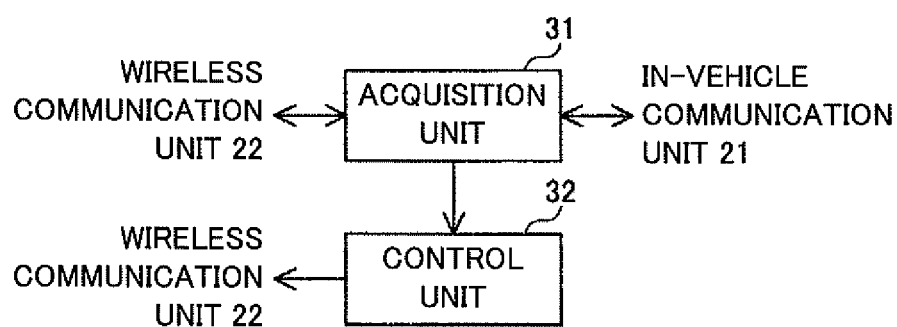
FIG. 6 illustrates an example of the configuration of a communication control device in the on-vehicle communication system according to Embodiment 1 of the present invention.

FIG. 6 illustrates an example of the configuration of a communication control device in the on-vehicle communication system according to Embodiment 1 of the present invention.

Referring to FIG. 6, the communication control device 101 includes an acquisition unit 31 and a control unit 32.

Referring to FIG. 5 and FIG. 6, the acquisition unit 31 acquires status information indicating the status of a queue for storing in the switching device 151 communication data from the out-of-vehicle communication device 111A of itself. More specifically, the acquisition unit 31 acquires status information S1 indicating the free status of this queue, for example.

Concretely, the acquisition unit 31 registers, for example, pairs of transmission source IP addresses and transmission destination IP addresses.

The acquisition unit 31 monitors, for example, IP packets received by the wireless communication unit 22. When the wireless communication unit 22 receives an IP packet including a transmission source IP address and a transmission destination IP address that are not registered, the acquisition unit 31 acquires the transmission source IP address and the transmission destination IP address from this IP packet. The acquisition unit 31 then registers the acquired transmission source IP address and the transmission destination IP address.

In this example, a pair of IP addresses of the server 171 being a transmission source IP address and the navigation device 111E being a transmission destination IP address are registered.

When a predetermined information acquisition timing comes, for example, the communication control device 101 creates a status request, which includes the registered transmission destination IP address, for requesting the status information S1 and transmits the created status request to the switching device 151 via the in-vehicle communication unit 21. The information acquisition timing may here be a timing for reception of an IP packet by the wireless communication unit 22, timings at regular intervals or timings at irregular intervals.

Referring again to FIG. 3, when receiving the status request from the out-of-vehicle communication device 111A, the switching unit 51 in the switching device 151 outputs the port number of the communication port 54 through which the status request is received (hereinafter also referred to as a reception port number) and the status request to the processing unit 52.

When receiving the reception port number and the status request from the switching unit 51, the processing unit 52 creates status information S1 according to the received status request.

More specifically, the processing unit 52 acquires the transmission destination IP address from the status request and performs priority specifying processing for specifying priority by using the acquired transmission destination IP address and reception port number.

Concretely, the processing unit 52 acquires the MAC address corresponding to the reception port number, that is, the MAC address of the out-of-vehicle communication device 111A from the connection table in the switching unit 51. Furthermore, the processing unit 52 acquires a port number corresponding to the transmission destination IP address from the routing table and acquires an MAC address corresponding to the acquired port number, that is, the MAC address of the navigation device 111E from the connection table in the switching unit 51.

The processing unit 52 specifies the communication path PN from the MAC address of the out-of-vehicle communication device 111A and the MAC address of the navigation device 111E, and acquires a priority corresponding to the specified communication path PN, that is, the lowest priority from the priority table in the switching unit 51.

The processing unit 52 acquires in bytes a free capacity in the region R[N] corresponding to the specified priority, for example, and creates status information S1 indicating the acquired free capacity. The processing unit 52 transmits the created status information S1 to the out-of-vehicle communication device 111A via the switching unit 51.

Referring again to FIG. 5 and FIG. 6, when receiving the status information S1 from the switching device 151 via the in-vehicle communication unit 21, the acquisition unit 31 in the communication control device 101 outputs the received status information S1 to the control unit 32.

The acquisition unit 31 further acquires, for example, transmission information concerning transmission of communication data from the external device to the out-of-vehicle communication device 111A.

Concretely, the acquisition unit 31 acquires, for example, transmission information T1 indicating the transmission amount of the communication data to be transmitted by the external device. The external device here is a device having the registered transmission source IP address, that is, the server 171.

More specifically, when the information acquisition timing comes, for example, the acquisition unit 31 creates a transmission amount request for requesting transmission information T1 and transmits the created transmission amount request to the server 171 via the wireless communication unit 22 and the radio base station device 161.

Referring again to FIG. 2, when receiving the transmission amount request from the out-of-vehicle communication device 111A, the server 171 creates transmission information T1 indicating in bytes the amount of the communication data to be transmitted, for example, according to the received transmission amount request and transmits the created transmission information T1 to the out-of-vehicle communication device 111A.

Referring again to FIG. 5 and FIG. 6, when receiving transmission information T1 from the server 171 via the radio base station device 161 and the wireless communication unit 22, the acquisition unit 31 in the communication control device 101 outputs the received transmission information T1 to the control unit 32.

The control unit 32 determines restriction of transmission of the communication data from the external device to the out-of-vehicle communication device 111A based on the status information S1 acquired by the acquisition unit 31.

More specifically, the control unit 32 determines restriction of transmission of the communication data from the external device to the out-of-vehicle communication device 111A based on, for example, the status information S1 and transmission information T1 acquired by the acquisition unit 31.

Concretely, the control unit 32 compares the amount of the free capacity in the region R[N] indicated by the status information S1 with the communication data amount to be transmitted by the server 171 indicated by the transmission information T1, for example.

If the free capacity in the region R[N] is smaller than the communication data amount to be transmitted by the server 171, the control unit 32 determines restriction of transmission of the communication data from the server 171 to the out-of-vehicle communication device 111A of itself.

If the above-described restriction of transmission is determined, the control unit 32 reduces, for example, the speed of transmission from the server 171 to the out-of-vehicle communication device 111A of itself.

More specifically, the control unit 32 outputs to the wireless communication unit 22 a setting request SR1 for requesting a setting change to a communication speed lower than the current communication speed.

When receiving the setting request SR1 from the control unit 32, the wireless communication unit 22 newly sets the combination between a modulation method in wireless communication with the radio base station device 161 and an error-correcting method such that the communication speed is reduced according to the received setting request SR1, for example.

The wireless communication unit 22 then wirelessly communicates with the radio base station device 161 according to the newly-set combination.

Note that the control unit 32 may be configured to reduce the transmission speed of the communication data for the server 171, not being limited to reduce the communication speed of the wireless communication for the wireless communication unit 22.

More specifically, the control unit 32 transmits a setting request SR2 for requesting a setting change to a transmission speed lower than the current communication speed to the server 171 via the wireless communication unit 22 and the radio base station device 161, for example. When receiving the setting request SR2 from the out-of-vehicle communication device 111A, for example, the server 171 sets a new transmission speed lower than the current transmission speed according to the received setting request SR2 and transmits the communication data to the out-of-vehicle communication device 111A at the newly-set transmission speed.

Furthermore, the control unit 32 may be configured to reduce the transmission speed of the communication data for the in-vehicle communication unit 21, not limited to reduce the communication speed of the wireless communication for the wireless communication unit 22.

More specifically, the control unit 32 outputs to the in-vehicle communication unit 21, for example, a setting request SR3 for requesting a setting change to a transmission speed lower than the current transmission speed. When receiving the setting request SR3 from the control unit 32, for example, the in-vehicle communication unit 21 sets a new transmission speed lower than the current transmission speed according to the received setting request SR3. The in-vehicle communication unit 21 temporarily accumulates an Ethernet frame to be transmitted to the switching device 151 in a transmission buffer and delays the transmission of the Ethernet frame, for example, to thereby transmit the Ethernet frame in the transmission buffer to the switching device 151 at the transmission speed set anew.

Moreover, the control unit 32 may be configured to stop transmission of the communication data from the server 171, not limited to reduce the communication speed of the wireless communication for the wireless communication unit 22.

More specifically, the control unit 32 transmits a stop request for requesting the server 171 to stop the transmission of the communication data to the server 171 via the wireless communication unit 22 and the radio base station device 161. When receiving the stop request from, for example, the out-of-vehicle communication device 111A, the server 171 stops the transmission of the communication data to the out-of-vehicle communication device 111A according to the received stop request.

[Modification 1 of Communication Control Device 101]

The acquisition unit 31 acquires, for example, status information S2 indicating the loss rate of the communication data to be stored in the queues for storing in the switching device 151 communication data from the out-of-vehicle communication device 111A of itself.

Concretely, when an information acquisition timing comes, for example, the acquisition unit 31 creates a status request, which includes the registered transmission destination IP address, for requesting status information S2, and transmits the created status request to the switching device 151 via the in-vehicle communication unit 21.

Referring again to FIG. 3, when receiving the status request from the out-of-vehicle communication device 111A, the switching unit 51 in the switching device 151 outputs the reception port number and the status request to the processing unit 52.

When receiving the reception port number and the status request from the switching unit 51, the processing unit 52 creates status information S2 according to the received status request.

More specifically, the processing unit 52 acquires the transmission destination IP address from the status request and performs count value acquisition processing for acquiring a reception count value and a transmission count value using the acquired transmission destination IP address and the reception port number.

Concretely, the processing unit 52 acquires a reception count value from a reception counter corresponding to the reception communication port 54, that is, the communication port 54 with the port number through which the Ethernet frame stored in the region R[N] is received.

In addition, the processing unit 52 acquires a port number corresponding to the transmission destination IP address, that is, a port number of the transmission destination of the Ethernet frame stored in the region R[N] from the routing table and acquires a transmission count value from a transmission counter corresponding to the communication port 54 with the acquired port number.

The processing unit 52 calculates a loss rate of the communication data to be stored in the region R[N] based on, for example, the acquired reception count value and transmission count value.

More specifically, the processing unit 52, for example, calculates a value obtained by dividing an increment per unit time of the transmission count value by an increment per unit time of the reception count value, i.e., a success rate, and subtracts the success rate from 1 to thereby evaluate the loss rate of the communication data to be stored in the region R[N].

The processing unit 52 creates status information S2 indicating the calculated loss rate and transmits the created status information S2 to the out-of-vehicle communication device 111A via the switching unit 51, for example.

Referring again to FIG. 5 and FIG. 6, when receiving the status information S2 from the switching device 151 via the in-vehicle communication unit 21, the acquisition unit 31 in the communication control device 101 outputs the received status information S2 to the control unit 32.

The acquisition unit 31 further acquires, for example, transmission information T2 indicating an allowable delay time for the communication data to be transmitted by the external device. The external device here is the server 171. The allowable delay time is made shorter for the communication data that is required for simultaneousness such as map information or the like. In contrast thereto, the allowable delay time is made longer for the communication data that is not required for simultaneousness but is important such as firmware update information, for example.

More specifically, when the information acquisition timing comes, for example, the acquisition unit 31 creates an allowable delay request for requesting transmission information T2, and transmits the created allowable delay request to the server 171 via the wireless communication unit 22 and the radio base station device 161.

Referring again to FIG. 2, when receiving the allowable delay request from the out-of-vehicle communication device 111A, the server 171 creates transmission information T2 according to the received allowable delay request and transmits the created transmission information T2 to the out-of-vehicle communication device 111A.

Referring again to FIG. 5 and FIG. 6, when receiving the transmission information T2 from the server 171 via the radio base station device 161 and the wireless communication unit 22, the acquisition unit 31 in the communication control device 101 outputs the received transmission information T2 to the control unit 32.

The control unit 32 determines restriction of transmission of the communication data from the external device to the out-of-vehicle communication device 111A based on, for example, the status information S2 and transmission information T2 acquired by the acquisition unit 31.

More specifically, in the case where the loss rate indicated by the status information S2 is equal to or larger than a predetermined threshold Th21, if the allowable delay time indicated by the transmission information T2 is equal to or larger than a predetermined threshold Th22, the control unit 32 determines that the speed of the communication between the server 171 and the out-of-vehicle communication device 111A of itself is to be reduced.

On the other hand, in the above-mentioned case, if the allowable delay time indicated by the transmission information T2 is smaller than the predetermined threshold Th22, the control unit 32 determines that transmission of the communication data from the server 171 is to be stopped.

[Modification 2 of Communication Control Device 101]

The acquisition unit 31 acquires, for example, status information S3 indicating a throughput of the communication data to be stored in the queues for storing in the switching device 151 communication data from the out-of-vehicle communication device 111A of itself.

Concretely, when an information acquisition timing comes, for example, the acquisition unit 31 creates a status request, which includes the registered transmission destination IP address, for requesting status information S3, and transmits the created status request to the switching device 151 via the in-vehicle communication unit 21.

Referring again to FIG. 3, when receiving the status request from the out-of-vehicle communication device 111A, the switching unit 51 in the switching device 151 outputs the reception port number and the status request to the processing unit 52.

When receiving the reception port number and the status request from the switching unit 51, the processing unit 52 creates status information S3 according to the received status request.

More specifically, the processing unit 52 acquires the transmission destination IP address from the status request, and performs throughput acquisition processing for acquiring an in-vehicle throughput and an in- and-out-of vehicle throughput using the acquired transmission destination IP address and the reception port number.

Concretely, the processing unit 52 specifies that the VLAN corresponding to the reception port number is VLAN1 based on the VLAN table.

Furthermore, the processing unit 52 acquires a port number corresponding to the transmission destination IP address from the routing table, and specifies that the VLAN corresponding to the acquired port number is VLAN2.

The processing unit 52 calculates, for example, a throughput of the communication data to be transmitted and received among the in-vehicle devices (hereinafter also referred to as an in-vehicle throughput) based on the transmission throughput and the reception throughput of VLAN1 measured by the switching unit 51.

The processing unit 52 further calculates, for example, a throughput of the communication data to be transmitted and received between the out-of-vehicle device and the in-vehicle device (hereinafter also referred to as an in-and-out-of-vehicle throughput) based on the transmission throughput and the reception throughput of VLAN2 measured by the switching unit 51.

The processing unit 52 creates status information S3 indicating the calculated in-vehicle throughput and in-and-out-of-vehicle throughput, and transmits the created status information S3 to the out-of-vehicle communication device 111A via the switching unit 51.

Referring again to FIG. 5 and FIG. 6, when receiving the status information S3 from the switching device 151 via the in-vehicle communication unit 21, the acquisition unit 31 in the communication control device 101 outputs the received status information S3 to the control unit 32.

When the information acquisition timing comes, for example, the acquisition unit 31 creates an allowable delay request for requesting transmission information T2 and transmits the created allowable delay request to the server 171 via the wireless communication unit 22 and the radio base station device 161.

When receiving the transmission information T2 from the server 171 via the radio base station device 161 and the wireless communication unit 22 in response to the allowable delay request, the acquisition unit 31 outputs the received transmission information T2 to the control unit 32.

The control unit 32 determines, for example, restriction of transmission of the communication data from the external device to the out-of-vehicle communication device 111A based on the status information S3 and transmission information T2 acquired by the acquisition unit 31.

More specifically, in the case where the difference between the in-and-out-of-vehicle throughput and the in-vehicle throughput indicated by the status information S3 is equal to or larger than a predetermined threshold Th31, if the allowable delay time indicated by the transmission information T2 is equal to or larger than a predetermined threshold Th32, the control unit 32 determines that the speed of the communication between the server 171 and the out-of-vehicle communication device 111A of itself is to be reduced.

On the other hand, in the above-mentioned case, if the allowable delay time indicated by the transmission information T2 is smaller than the predetermined threshold Th32, the control unit 32 determines that transmission of the communication data from the server 171 is to be stopped.

[Modification 3 of Communication Control Device 101]

The acquisition unit 31 acquires, for example, status information S4 indicating a predicted value of a free status in the queues for storing in the switching device 151 communication data from the out-of-vehicle communication device 111A of itself.

Concretely, when an information acquisition timing comes, for example, the acquisition unit 31 creates a status request, which includes the registered transmission destination IP address, for requesting status information S4 and transmits the created status request to the switching device 151 via the in-vehicle communication unit 21.

Referring again to FIG. 3, the processing unit 52 in the switching device 151 holds, for example, capacity history information indicating the history of free capacities in the regions R[1]-R[N] in the buffer 53 and updates the capacity history information at predetermined intervals.

When receiving the status request from the out-of-vehicle communication device 111A, the switching unit 51 outputs the reception port number and the status request to the processing unit 52.

When receiving the reception port number and the status request from the switching unit 51, the processing unit 52 creates status information S4 according to the received status request.

More specifically, the processing unit 52 acquires the transmission destination IP address from the status request, and performs priority specifying processing using the acquired transmission destination IP address and the reception port number.

The processing unit 52 predicts a future free capacity in the region R[N] based on the current free capacity in the region R[N] corresponding to the priority specified by the priority specifying processing and the capacity history information, and creates status information S4 indicating the result of the prediction. The processing unit 52 transmits the created status information S4 to the out-of-vehicle communication device 111A via the switching unit 51.

Referring again to FIG. 5 and FIG. 6, when receiving the status information S4 from the switching device 151 via the in-vehicle communication unit 21, the acquisition unit 31 in the communication control device 101 outputs the received status information S4 to the control unit 32.

When the information acquisition timing comes, for example, the acquisition unit 31 creates a transmission amount request for requesting transmission information T1, and transmits the created transmission amount request to the server 171 via the wireless communication unit 22 and the radio base station device 161.

When receiving transmission information T1 from the server 171 via the radio base station device 161 and the wireless communication unit 22 in response to the transmission amount request, the acquisition unit 31 outputs the received transmission information T1 to the control unit 32.

The control unit 32 determines, for example, restriction of transmission of the communication data from the server 171 to the out-of-vehicle communication device 111A based on the status information S4 and transmission information T1 acquired by the acquisition unit 31.

More specifically, the control unit 32 compares, for example, the predicted value of the free capacity in the region R[N] indicated by the status information S4 with the communication data amount to be transmitted by the server 171 that is indicated by the transmission information T1.

If the predicted value of the free capacity in the region R[N] is smaller than the communication data amount to be transmitted by the server 171, for example, the control unit 32 determines restriction of transmission of the communication data from the server 171 to the out-of-vehicle communication device 111A of itself.

[Modification 4 of Communication Control Device 101]

The acquisition unit 31 acquires, for example, status information S5 indicating a predicted value of a loss rate of the communication data to be stored in the queues for storing in the switching device 151 communication data from the out-of-vehicle communication device 111A of itself.

More specifically, when an information acquisition timing comes, for example, the acquisition unit 31 creates a status request, which includes the registered transmission destination IP address, for requesting status information S5 and transmits the created status request to the switching device 151 via the in-vehicle communication unit 21.

Referring again to FIG. 3, the processing unit 52 in the switching device 151, for example, holds loss rate history information indicating the history of loss rates in the regions R[1]-R[N] of the buffer 53 and updates the loss rate history information at predetermined intervals.

When receiving the status request from the out-of-vehicle communication device 111A, the switching unit 51 outputs the reception port number and the status request to the processing unit 52.

When receiving the reception port number and the status request from the switching unit 51, the processing unit 52 creates status information S5 according to the received status request.

More specifically, the processing unit 52 acquires the transmission destination IP address from the status request and performs count value acquisition processing using the acquired transmission destination IP address and the reception port number.

The processing unit 52 calculates, for example, a current loss rate of the communication data to be stored in the region R[N] based on the reception count value and transmission count value acquired by the count value acquisition processing.

The processing unit 52 predicts, for example, a future loss rate in the region R[N] based on the calculated loss rate and the loss rate history information, and creates status information S5 indicating the result of the prediction. The processing unit 52 transmits the created status information S5 to the out-of-vehicle communication device 111A via the switching unit 51.

Referring again to FIG. 5 and FIG. 6, when receiving the status information S5 from the switching device 151 via the in-vehicle communication unit 21, the acquisition unit 31 in the communication control device 101 outputs the received status information S5 to the control unit 32.

When the information acquisition timing comes, for example, the acquisition unit 31 creates an allowable delay request for requesting transmission information T2, and transmits the created allowable delay request to the server 171 via the wireless communication unit 22 and the radio base station device 161.

When receiving transmission information T2 from the server 171 via the radio base station device 161 and the wireless communication unit 22 in response to the allowable delay request, the acquisition unit 31 outputs the received transmission information T2 to the control unit 32.

The control unit 32 determines, for example, restriction of transmission of the communication data from the external device to the out-of-vehicle communication device 111A based on the status information S5 and transmission information T2 acquired by the acquisition unit 31.

Concretely, in the case where the predicted value of the loss rate indicated by the status information S5 is equal to or larger than a predetermined threshold Th51, if the allowable delay time indicated by the transmission information T2 is equal to or larger than a predetermined threshold Th52, for example, the control unit 32 determines that the speed of the communication between the server 171 and the out-of-vehicle communication device 111A of itself is to be reduced.

On the other hand, in the above-mentioned case, if the allowable delay time indicated by the transmission information T2 is smaller than the predetermined threshold Th52, for example, the control unit 32 determines that transmission of the communication data from the server 171 is to be stopped.

[Modification 5 of Communication Control Device 101]

The acquisition unit 31 acquires, for example, status information S6 indicating a predicted value of the throughput of the communication data to be stored in the queues for storing in the switching device 151 communication data from the out-of-vehicle communication device 111A of itself.

Concretely, when an information acquisition timing comes, for example, the acquisition unit 31 creates a status request, which includes the registered transmission destination IP address, for requesting status information S6 and transmits the created status request to the switching device 151 via the in-vehicle communication unit 21.

Referring again to FIG. 3, the processing unit 52 in the switching device 151 holds, for example, throughput history information indicating a history of measured values of the transmission throughput and the reception throughput for each VLAN and updates the throughput history information at predetermined intervals.

When receiving the status request from the out-of-vehicle communication device 111A, the switching unit 51 outputs the reception port number and the status request to the processing unit 52.

When receiving the reception port number and the status request from the switching unit 51, the processing unit 52 creates status information S6 according to the received status request.

More specifically, the processing unit 52 acquires the transmission destination IP address from the status request and performs throughput acquisition processing using the acquired transmission destination IP address and reception port number.

The processing unit 52 predicts, for example, a future in-vehicle throughput based on the in-vehicle throughput calculated by the throughput acquisition processing and the throughput history information.

The processing unit 52 predicts, for example, a future in-and-out-of-vehicle throughput based on the in-and-out-of-vehicle throughput calculated by the throughput acquisition processing and the throughput history information.

The processing unit 52 creates status information S6 indicating the predicted value of the in-vehicle throughput and the predicted value of the in-and-out-of-vehicle throughput, and transmits the created status information S6 to the out-of-vehicle communication device 111A via the switching unit 51.

Referring again to FIG. 5 and FIG. 6, when receiving the status information S6 from the switching device 151 via the in-vehicle communication unit 21, the acquisition unit 31 in the communication control device 101 outputs the received status information S6 to the control unit 32.

When the information acquisition timing comes, for example, the acquisition unit 31 creates an allowable delay request for requesting transmission information T2, and transmits the created allowable delay request to the server 171 via the wireless communication unit 22 and the radio base station device 161.

When receiving transmission information T2 from the server 171 via the radio base station device 161 and the wireless communication unit 22 in response to the allowable delay request, the acquisition unit 31 outputs the received transmission information T2 to the control unit 32.

The control unit 32 determines, for example, restriction of transmission of the communication data from the external device to the out-of-vehicle communication device 111A based on the status information S6 and transmission information T2 acquired by the acquisition unit 31.

Concretely, in the case where the difference between the predicted value of the in-and-out-of-vehicle throughput and the predicted value of the in-vehicle throughput that are indicated by the status information S6 is equal to or larger than a predetermined threshold Th61, if the allowable delay time indicated by the transmission information T2 is equal to or larger than a predetermined threshold Th62, the control unit 32 determines that the speed of the communication between the server 171 and the out-of-vehicle communication device 111A of itself is to be reduced.

If, on the other hand, the allowable delay time indicated by the transmission information T2 is smaller than the predetermined threshold Th62 in the above-mentioned case, the control unit 32 determines that transmission of the communication data from the server 171 is to be stopped.

[Operation]

Each of the devices in the on-vehicle communication system 301 includes a computer, and an arithmetic processing unit such as a CPU or the like in the computer reads out programs including a part or all of the steps in a sequence diagram or flowchart described below from a memory (not illustrated) and executes them. Each of the programs of these devices may be installed from the outside. Each of the programs of these devices is made commercially available in such a manner as to be stored in a recording medium.

Figure 7:
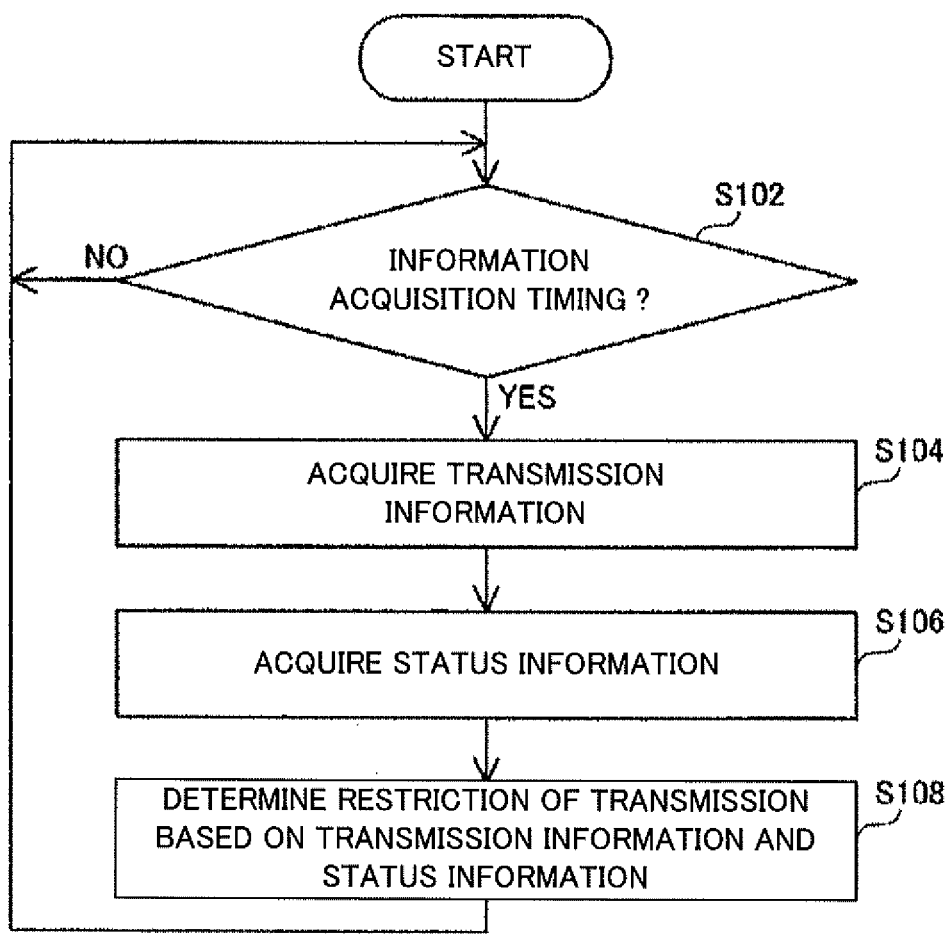
FIG. 7 is a flowchart defining an operation procedure performed when the communication control device in the on-vehicle communication system according to Embodiment 1 of the present invention determines restriction of the transmission of communication data.

FIG. 7 is a flowchart defining an operation procedure when the communication control device in the on-vehicle communication system according to Embodiment 1 of the present invention determines restriction of transmission of communication data.

Referring to FIG. 7, the communication control device 101 is first held on standby until an information acquisition timing comes (NO at step S102).

When the information acquisition timing comes (YES at step S102), the communication control device 101 acquires transmission information from the server 171 (step S104).

The communication control device 101 then acquires status information from the switching device 151 (step S106).

Next, the communication control device 101 determines restriction of transmission of the communication data from the server 171 to the out-of-vehicle communication device 111A based on the acquired transmission information and status information (step S108).

Succeedingly, the communication control device 101 is held on standby until a new information acquisition timing comes (NO at step S102).

It is noted that the order of the above-described steps S104 and S106 may be interchanged without being limited to such an order.

Furthermore, the communication control device 101 is configured, but not limited, to acquire the status information and the transmission information at the same information acquisition timing (YES at step S102, step S104 and step S106). The communication control device 101 may be configured to acquire the status information and the transmission information at different timings.

Moreover, in the on-vehicle communication system according to Embodiment 1 of the present invention, the communication control device 101 is configured, but not limited, to be provided inside the out-of-vehicle communication device 111A. The communication control device 101 may be configured to be provided outside the out-of-vehicle communication device 111A.

Furthermore, in the communication control device according to Embodiment 1 of the present invention, the control unit 32 is configured, but not limited, to determine restriction of transmission of the communication data from the server 171 to the out-of-vehicle communication device 111A based on the status information and transmission information acquired by the acquisition unit 31. The control unit 32 may be configured to determine restriction of transmission of the communication data based on the status information. Concretely, if the free capacity in the region R[N] indicated by the status information S1 is equal to or smaller than a predetermined threshold, for example, the control unit 32 determines restriction of transmission of the communication data.

Additionally, in the communication control device according to Embodiment 1 of the present invention, the control unit 32 is configured, but not limited, to determine restriction of transmission of communication data using any one of the status information S1-S6. The control unit 32 may be configured to determine restriction of transmission of communication data by using at least two of the status information S1-S6.

In addition, the switching device according to Embodiment 1 of the present invention is configured, but not limited, to be provided with multiple queues in the buffer 53. It may be configured to be provided with one queue in the buffer 53. In this case, the status information indicating the status of one queue is transmitted to the communication control device 101.

Moreover, the switching device according to Embodiment 1 of the present invention may be configured to, but not limited, to store the communication data from the out-of-vehicle communication device 111A in the region R[N]. It may be configured to store at least the communication data from the out-of-vehicle communication device 111A in the queue. Concretely, it may be configured to store the communication data from the out-of-vehicle communication device 111A and the communication data from the function units 111 other than the out-of-vehicle communication device 111A in the region R[N].

Meanwhile, in the case where the on-vehicle network as described in Patent Document 1 is connected to an external network outside the vehicle, an out-of-vehicle communication device for communicating with the external network may be provided in the vehicle. In the case where the out-of-vehicle communication device transmits information received from the external network to a target device in the on-vehicle network, if there is not enough free space in the buffer of the target device, the target device may discard information that is unable to be stored in the buffer. In such a case, the out-of-vehicle communication device transmits the information again, resulting in reduction of information transmission efficiency.

In contrast thereto, the communication control device according to Embodiment 1 of the present invention is used for the on-vehicle communication system 301 including an out-of-vehicle communication device 111A that is one of a plurality of function units 111 provided in a vehicle and is capable of communicating with an external device outside the vehicle, and a switching device 151 that is capable of relaying communication data from one of the function units 111 to another one of the function units 111. An acquisition unit 31 acquires status information indicating a status of a queue for storing in the switching device 151 at least communication data from the out-of-vehicle communication device 111A. A control unit 32 determines restriction of transmission of communication data from the external device to the out-of-vehicle communication device 111A based on the status information acquired by the acquisition unit 31.

According to such a configuration, it is possible to determine, based on the status information, for example, whether or not the communication data can be transmitted to the function unit 111 being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of the communication data overflowing while the stop of the unnecessary transmission of the communication data allows an open frequency band to be available for transmission of another communication data. Accordingly, it is possible to efficiently transmit information from the outside of the vehicle to the on-vehicle network.

Furthermore, in the communication control device according to Embodiment 1 of the present invention, the status of the queue includes at least any one of a free status in the queue, and a loss rate and a throughput of communication data to be stored in the queue.

According to such a configuration, a communication data amount that can be stored in the queues, a success rate of the relay processing of the communication data stored in the queues and a transmission speed of the communication data stored in the queues can be acquired. It is thus possible to correctly determine whether or not the communication data can be transmitted to the function unit 111 of the transmission destination so as not to cause the communication data to overflow the queues.

Moreover, in the communication control device according to Embodiment 1 of the present invention, the status of the queue includes a predicted value of the status.

According to such a configuration, a future storable communication data amount in the queues, a future success rate of the relay processing of the communication data stored in the queues and a future transmission speed of the communication data stored in the queues can be acquired. It is thus possible to earlier determine whether or not the communication data can be transmitted to the function unit 111 of the transmission destination so as not to cause the communication data to overflow the queues.

Additionally, in the communication control device according to Embodiment 1 of the present invention, the acquisition unit 31 further acquires transmission information concerning transmission of communication data from the external device to the out-of-vehicle communication device 111A. The control unit 32 determines the restriction of the transmission of the communication data from the external device to the out-of-vehicle communication device 111A based on the status information and the transmission information that are acquired by the acquisition unit 31.

According to such a configuration, it is possible to determine the restriction of the transmission of the communication data in view of the speed of the communication between the external device and the out-of-vehicle communication device 111A and an allowable delay time of the communication data to be transmitted by the external device, for example.

In addition, the out-of-vehicle communication device according to Embodiment 1 of the present invention is one of the function units 111 provided in a vehicle and is capable of communicating with an external device outside the vehicle. The acquisition unit 31 acquires status information indicating a status of a queue for storing at least communication data from the out-of-vehicle communication device 111A in a switching device 151 that is capable of relaying communication data from one of the function units 111 to another one of the function units 111. The control unit 32 determines restriction of transmission of communication data from the external device to the out-of-vehicle communication device 111A based on the status information acquired by the acquisition unit 31.

According to such a configuration, it is possible to determine, based on the status information, for example, whether or not the communication data can be transmitted to the function unit 111 of a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

The following describes another embodiment of the present invention with reference to the drawings thereof. Note that the same or corresponding parts are denoted by the same reference codes in the drawings to avoid repetitive descriptions therefor.

Embodiment 2

The present embodiment relates to an on-vehicle communication system in the case where a communication control device is provided in a switching device unlike the on-vehicle communication system according to Embodiment 1. The details other than the following description are similar to those of the on-vehicle communication system according to Embodiment 1.

Figure 8:
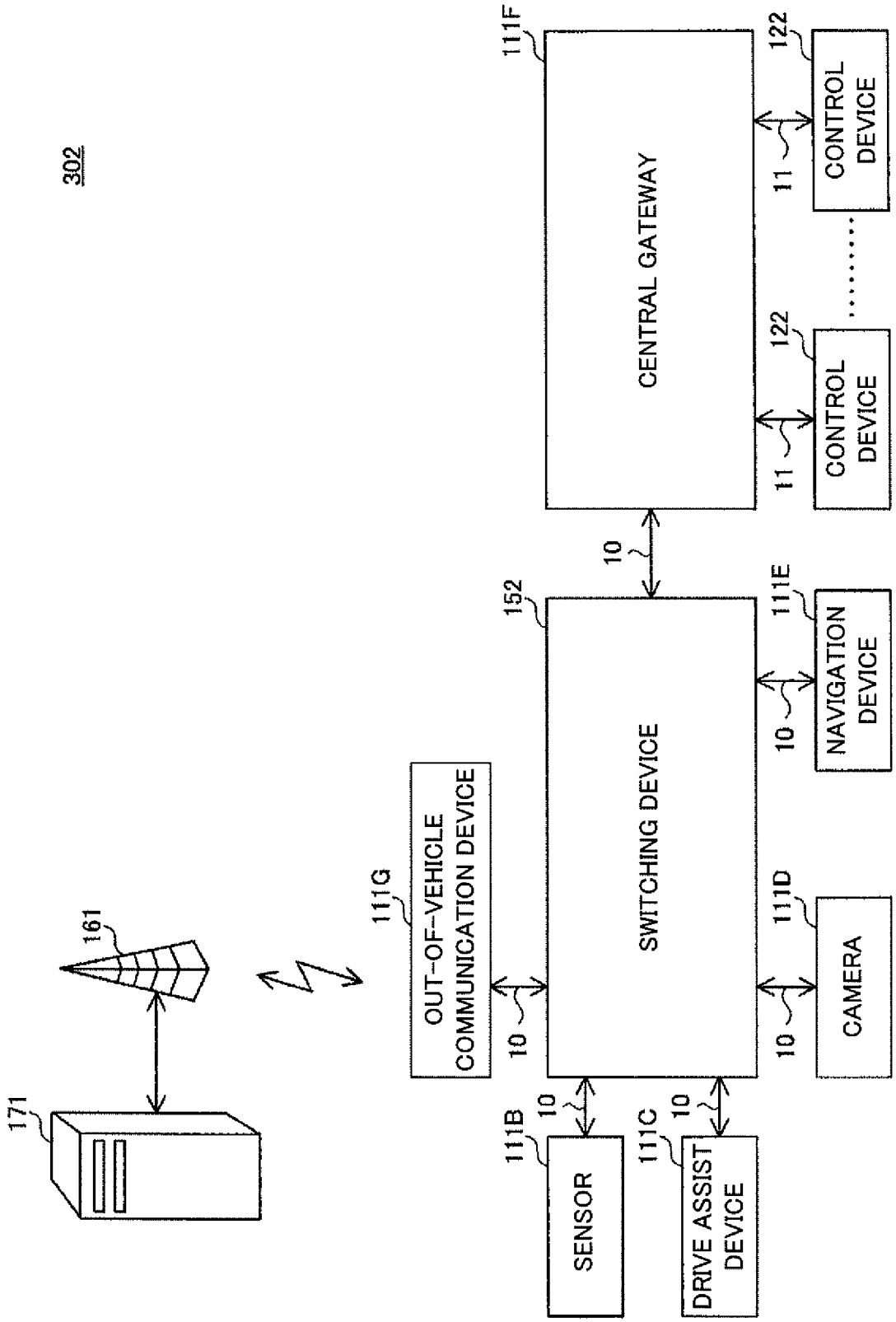
FIG. 8 illustrates an application example of an on-vehicle communication system according to Embodiment 2 of the present invention.

FIG. 8 illustrates an application example of an on-vehicle communication system according to Embodiment 2 of the present invention.

Referring to FIG. 8, the on-vehicle communication system 302 includes an out-of-vehicle communication device 111G and a switching device 152. The out-of-vehicle communication device 111G is one of the function units 111 and is able to communicate with a server 171, for example.

A sensor 111B, a drive assist device 111C, a camera 111D, a navigation device 111E, a central gateway 111F, a control device 122, a radio base station device 161 and a server 171 in the on-vehicle communication system 302 are respectively similar in operation to the sensor 111B, the drive assist device 111C, the camera 111D, the navigation device 111E, the central gateway 111F, the control device 122, the radio base station device 161 and the server 171 in the on-vehicle communication system 301 illustrated in FIG. 1.

Figure 9:
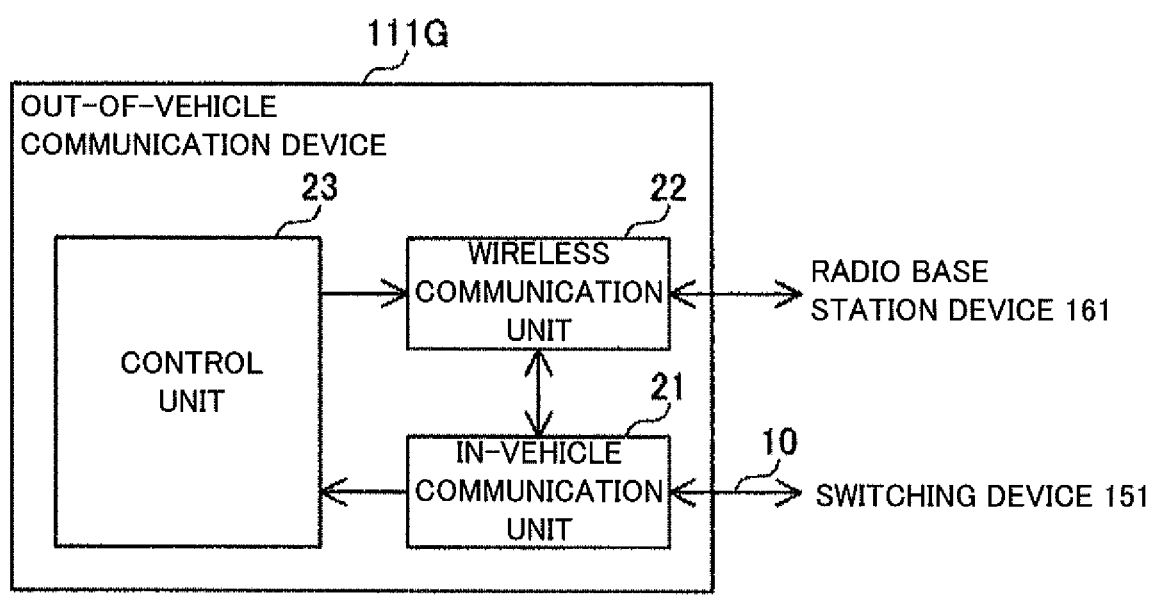
FIG. 9 illustrates an example of the configuration of an out-of-vehicle communication device in the on-vehicle communication system according to Embodiment 2 of the present invention.

FIG. 9 illustrates an example of the configuration of an out-of-vehicle communication device in the on-vehicle communication system according to Embodiment 2 of the present invention.

Referring to FIG. 9, the out-of-vehicle communication device 111G has a restriction unit 23 in place of the communication control device 101 unlike the out-of-vehicle communication device 111A illustrated in FIG. 5.

An in-vehicle communication unit 21 and a wireless communication unit 22 in the out-of-vehicle communication device 111G are respectively similar in operation to the in-vehicle communication unit 21 and the wireless communication unit 22 in the out-of-vehicle communication device 111A illustrated in FIG. 5.

Figure 10:
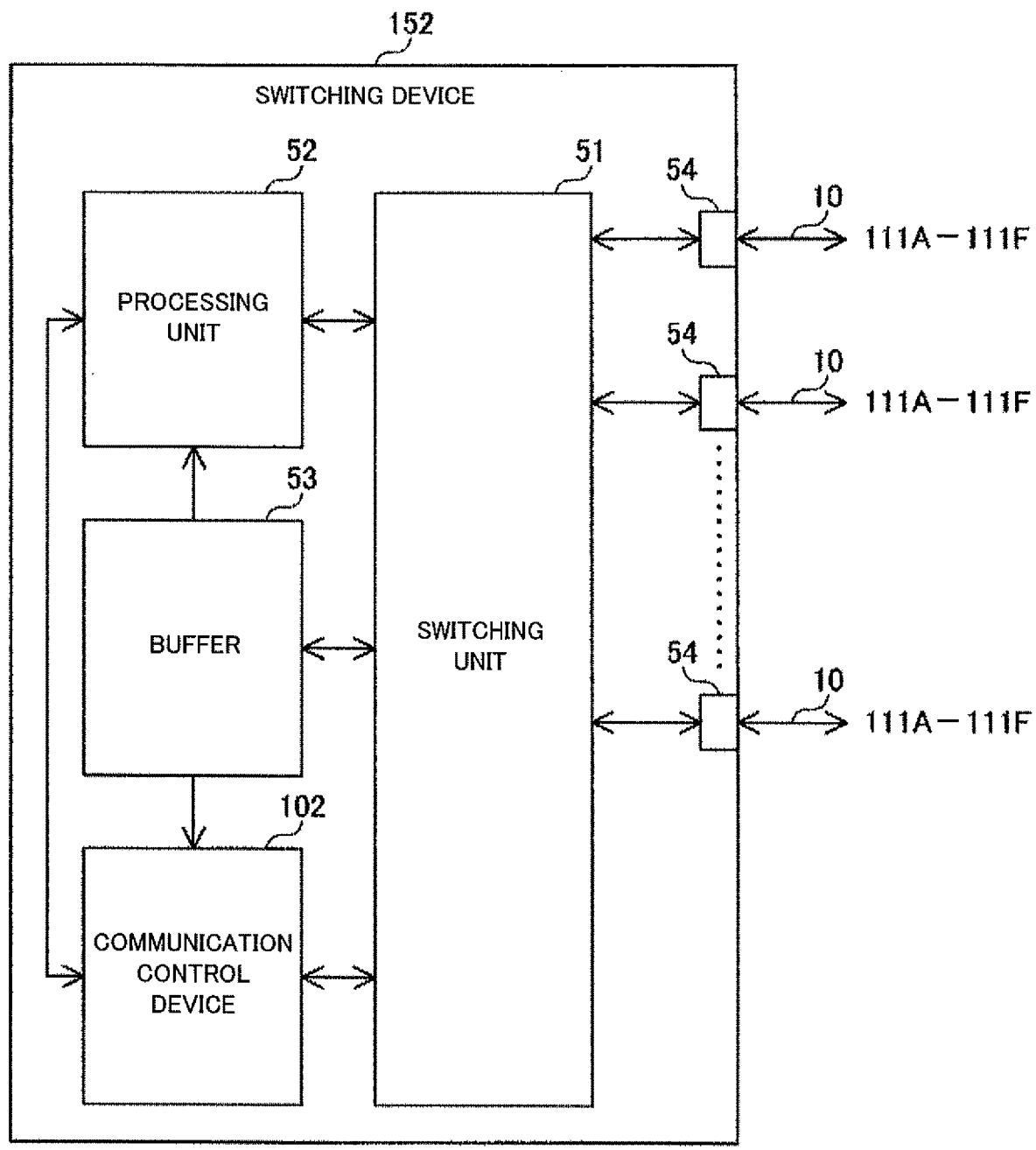
FIG. 10 illustrates an example of the configuration of a switching device in the on-vehicle communication system according to Embodiment 2 of the present invention.

FIG. 10 illustrates an example of the configuration of a switching device in the on-vehicle communication system according to Embodiment 2 of the present invention.

Referring to FIG. 10, the switching device 152 includes a switching unit 51, a processing unit 52, a buffer 53, multiple communication ports 54 and a communication control device 102.

The switching device 51, the processing unit 52 and the buffer 53 in the switching device 152 are respectively similar in operation to the switching device 51, the processing unit 52 and the buffer 53 in the switching device 151 illustrated in FIG. 3. The multiple communication ports 54 in the switching device 152 are respectively similar to the multiple communication ports 54 in the switching device 151 illustrated in FIG. 3.

Figure 11:
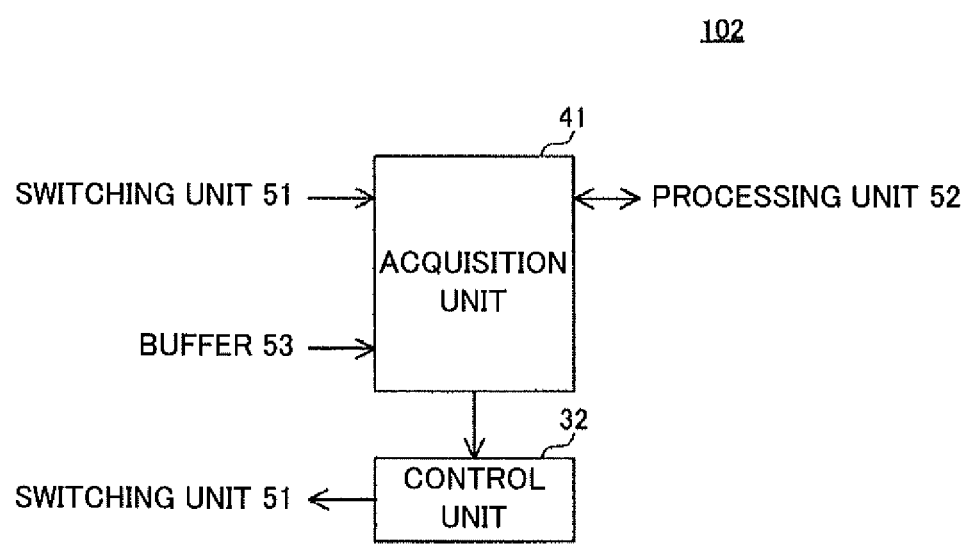
FIG. 11 illustrates an example of the configuration of a communication control device in the on-vehicle communication system according to Embodiment 2 of the present invention.

FIG. 11 illustrates an example of the configuration of a communication control device in the on-vehicle communication system according to Embodiment 2 of the present invention.

Referring to FIG. 11, the communication control device 102 includes an acquisition unit 41 in place of the acquisition unit 31 unlike the communication control device 101 illustrated in FIG. 6.

A control unit 32 of the communication control device 102 is similar in operation to the control unit 32 of the communication control device 101 illustrated in FIG. 6.

Referring to FIG. 10 and FIG. 11, the acquisition unit 41 acquires status information S7 indicating whether the communication data to be stored in the queues can be transmitted or not.

Concretely, the acquisition unit 41 registers, for example, a region R[N] as a monitoring region of the buffer 53 in which the communication data from the out-of-vehicle communication device 11G is stored.

The acquisition unit 41 monitors, for example, each of the regions in the buffer 53. When a predetermined information acquisition timing comes, for example, the acquisition unit 41 acquires a free capacity in the registered region R[N] in bytes and compares the acquired free capacity with a predetermined threshold Th71.

If the free capacity in the region R[N] is equal to or smaller than the predetermined threshold Th71, the acquisition unit 41 creates status information S7 indicating that the communication data to be stored in the region R[N] cannot be transmitted.

If, on the other hand, the free capacity in the region R[N] is larger than the predetermined threshold Th71, the acquisition unit 41 creates status information S7 indicating that the communication data to be stored in the region R[N] can be transmitted.

Note that the acquisition unit 41 may be configured to create the status information S7 based on the loss rate and the throughput of the communication data stored in the region R[N], the predicted value of the free capacity, the predicate value of the loss rate and the predicted value of the throughput without being restricted to create the status information S7 based on the free capacity in the region R[N].

The acquisition unit 41 outputs the created status information S7 to the control unit 32.

When receiving the status information S7 from the acquisition unit 41, the control unit 32 determines restriction of transmission of the communication data from the server 171 to the out-of-vehicle communication device 111G based on the received status information S7.

Concretely, if the status information S7 indicates that the communication data to be stored in the region R[N] can be transmitted, the control unit 32 determines that transmission of the communication data from the server 171 to the out-of-vehicle communication device 111G is not to be restricted.

If, on the other hand, the status information S7 indicates that the communication data to be stored in the region R[N] cannot be transmitted, the control unit 32 determines that transmission of the communication data from the server 171 to the out-of-vehicle communication device 111G is to be restricted and creates transmission restriction information. The control unit 32 transmits the created transmission restriction information to the out-of-vehicle communication device 111G via the switching unit 51.

Referring again to FIG. 9, when receiving transmission restriction information from the switching device 152 via the in-vehicle communication unit 21, the restriction unit 23 of the out-of-vehicle communication device 111G executes restriction of transmission of the communication data from the server 171 to the out-of-vehicle communication device 111G based on the received transmission restriction information.

Concretely, the restriction unit 23 reduces the speed of communication between the server 171 and the out-of-vehicle communication device 111G of itself, reduces the transmission speed of the communication data in the server 171, reduces the transmission speed of the communication data in the in-vehicle communication unit 21 or stops the transmission of the communication data from the server 171, for example.

[Modification of Communication Control Device 102]

Referring again to FIG. 10 and FIG. 11, the acquisition unit 41 registers therein, for example, pairs of the transmission source IP addresses and the transmission destination IP addresses included in respective IP packets from the out-of-vehicle communication device 111G.

The acquisition unit 41 monitors, for example, an Ethernet frame received by the switching unit 51 via the communication port 54 connected to the out-of-vehicle communication device 111G, and acquires, when the switching unit 51 receives an Ethernet frame including a transmission source IP address and a transmission destination IP address that are not registered, the transmission source IP address and the transmission destination IP address from this IP packet. The acquisition unit 41 registers the acquired transmission source IP address and transmission destination IP address.

In this example, a pair of the IP address of the server 171 being the transmission source IP address and the IP address of the navigation device 111E being the transmission destination IP address are registered.

The acquisition unit 41 acquires, for example, status information S1. Concretely, the acquisition unit 41 specifies, for example, the registered transmission source IP address and the reception port number from the routing table of the processing unit 52.

The acquisition unit 41 outputs a status request, which includes the registered transmission destination IP address, for requesting status information S1 and the specified reception port number to the processing unit 52, and receives from the processing unit 52 the status information S1 in response to the status request.

It is noted that the acquisition unit 41 may acquire status information S2, S3, S4, S5 or S6 in place of the status information S1. Concretely, the acquisition unit 41 outputs a status request, which includes the registered transmission destination IP address, for requesting status information S2, S3, S4, S5 or S6 and the reception port number to the processing unit 52 and receives from the processing unit 52 the corresponding status information in response to the status request.

The acquisition unit 41 further acquires, for example, transmission information T1 indicating the transmission amount of the communication data to be transmitted by the server 171.

More specifically, the acquisition unit 41 creates a transmission amount request for requesting transmission information T1 when an information acquisition timing comes, for example. The acquisition unit 41 then transmits to the server 171 the created transmission amount request regarding the registered transmission source IP address, that is, the IP address of the server 171 as a destination via the switching unit 51, the out-of-vehicle communication device 111G and the radio base station device 161.

When receiving transmission information T1 from the server 171 via the radio base station device 161, the out-of-vehicle communication device 111G and the switching unit 51 in response to the transmission amount request, the acquisition unit 41 outputs the received transmission information T1 to the control unit 32.

It is noted that the acquisition unit 41 may acquire transmission information T2 in place of the transmission information T1. Specifically, the acquisition unit 41 transmits an allowable delay request for requesting transmission information T2 regarding the IP address of the server 171 as a destination to the server 171 via the switching unit 51, the out-of-vehicle communication device 111G and the radio base station device 161. When receiving transmission information T2 from the server 171 via the radio base station device 161, the out-of-vehicle communication device 111G and the switching unit 51 in response to the allowable delay request, the acquisition unit 41 outputs the received transmission information T2 to the control unit 32.

The control unit 32 determines restriction of transmission of the communication data from the external device to the out-of-vehicle communication device 111G based on the status information S1 and transmission information T1 acquired by the acquisition unit 41.

Note that the control unit 32 may determine the above-described restriction of transmission of the communication data based on the status information S4 and the transmission information T1. Alternatively, the control unit 32 may determine restriction of transmission of the communication data based on the status information S2, S3, S5 or S6 and the transmission information T2.

If determining that the transmission of the communication data is to be restricted, the control unit 32 creates transmission restriction information and transmits the created transmission restriction information to the out-of-vehicle communication device 111G via the switching unit 51.

In the on-vehicle communication system according to Embodiment 2 of the present invention, the communication control device 102 is configured, but not limited, to be provided inside the switching device 151. The communication control device 102 may be provided outside the switching device 151.

In the communication control device according to Embodiment 2 of the present invention, the control unit 32 is configured, but not limited, to determine restriction of transmission of the communication data using any one of the status information S1 to S7. The control unit 32 may be configured to determine restriction of transmission of the communication data using at least two of the status information S1 to S7.

As described above, in the switching device according to Embodiment 2 of the present invention, the switching unit 51 performs relay processing relaying communication data from one of a plurality of function units 111 provided in a vehicle to another one of the function units 111. One or a plurality of queues store communication data. The acquisition unit 41 acquires status information indicating a status of the queue for storing at least communication data from the out-of-vehicle communication device 111G being one of the function units 111 and being capable of communicating with an external device outside the vehicle. The control unit 32 determines restriction of transmission of communication data from the external device to the out-of-vehicle communication device 111G based on the status information acquired by the acquisition unit 41.

According to such a configuration, it is possible to determine, based on the status information, for example, whether or not the communication data can be transmitted to the function unit 111 being a transmission destination so as not to cause the communication data to overflow the queues. Thus, in the case where the communication data is likely to overflow, it is possible to restrict the transmission speed of the communication data or to stop the transmission of the communication data, for example. The restriction of the transmission speed of the communication data can lower the probability of overflowing of the communication data whereas the stop of the unnecessary transmission of the communication data allows an open frequency band to be available for transmission of another communication data. Accordingly, it is possible to efficiently transmit information from the outside of the vehicle to the on-vehicle network.

Furthermore, in the switching device according to Embodiment 2 of the present invention, the status of the queue includes transmittability of communication data to be stored in the queue.

According to such a configuration, it is possible to easily and correctly recognize whether the communication data transmitted form the out-of-vehicle communication device 111G overflows the queue or not.

Since the other configurations and operation are similar to those of the on-vehicle communication system according to Embodiment 1, the detailed description thereof will not be repeated here.

It is noted that in the on-vehicle communication systems according to Embodiment 1 and Embodiment 2, the communication control device is configured, but not limited, to be included in either one of the out-of-vehicle communication device or the switching device. The communication control device may be configured as a device separate from the out-of-vehicle communication device, the switching device, etc. and may be connected to the out-of-vehicle communication device and the switching device.

Note that parts or all of the components and operation of the respective devices according to Embodiment 1 and Embodiment 2 of the present invention may appropriately be combined.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

The above description includes features of clauses described below.

[Clause 1]

A communication control device used in an on-vehicle communication system including an out-of-vehicle communication device being one of a plurality of function units provided in a vehicle and being capable of communicating with an external device outside the vehicle, and a switching device being capable of relaying communication data from one of the function units to another one of the function units, comprising:

an acquisition unit that acquires status information indicating a status of a queue for storing in the switching device at least communication data from the out-of-vehicle communication device; and a control unit that determines restriction of transmission of communication data from the external device to the out-of-vehicle communication device based on the status information acquired by the acquisition unit, wherein the vehicle is provided with a sensor, a drive assist device, a camera, a navigation device or a central gateway as the function units, the out-of-vehicle communication device is a telematics communication unit (TCU), and is able to wirelessly communicate with a radio base station device in compliance with a communication standard of long term evolution (LTE) or 3G, the external device is a server, the out-of-vehicle communication device communicates with the server via the radio base station device, and the communication control device is provided in the out-of-vehicle communication device or the switching device.

[Clause 2]

A Switching Device Comprising:

a switching unit that performs relay processing for relaying communication data from one of a plurality of function units provided in a vehicle to another one of the function units;

one or a plurality of queues storing the communication data;

an acquisition unit that acquires status information indicating a status of the queue for storing at least communication data from an out-of-vehicle communication device being one of the function units and being capable of communicating with an external device outside the vehicle; and a control unit that determines restriction of transmission of communication data from the external device to the out-of-vehicle communication device based on the status information acquired by the acquisition unit, wherein the vehicle is provided with a sensor, a drive assist device, a camera, a navigation device or a central gateway as the function units, the out-of-vehicle communication device is a telematics communication unit (TCU), and is able to wirelessly communicate with a radio base station device in compliance with a communication standard of long term evolution (LTE) or 3G, the external device is a server, and the out-of-vehicle communication device communicates with the server via the radio base station device.

[Clause 3]

An out-of-vehicle communication device being one of a plurality of function units provided in a vehicle and being capable of communicating with an external device outside the vehicle, comprising:

an acquisition unit that acquires status information indicating a status of a queue for storing at least communication data from the out-of-vehicle communication device in a switching device that is capable of relaying communication data from one of the function units to another one of the function units; and a control unit that determines restriction of transmission of communication data from the external device to the out-of-vehicle communication device based on the status information acquired by the acquisition unit, wherein the vehicle is provided with a sensor, a drive assist device, a camera, a navigation device or a central gateway as the function units, the out-of-vehicle communication device is a telematics communication unit (TCU), and is able to wirelessly communicate with a radio base station device in compliance with a communication standard of long term evolution (LTE) or 3G, the external device is a server, and the out-of-vehicle communication device communicates with the server via the radio base station device.

It is to be noted that, as used herein and in the appended claims, the singular forms "a", "an", and "the" include plural referents unless the context clearly dictates otherwise.

The embodiments disclosed this time are examples in all respects, and should be considered to be not restrictive. The scope of the present invention is not limited to the above-described meaning but is indicated by the claims, and it is intended that all modifications within the meaning and scope equivalent to the claims are included. In addition, the technical features described in the respective embodiments can be combined with each other.

The invention claimed is:

1. A communication control device used in an on-vehicle communication system including an out-of-vehicle communication device being one of a plurality of function units provided in a vehicle and being capable of communicating with an external device outside the vehicle, and a switching device being capable of relaying communication data from one of the function units to another one of the function units, the communication control device comprising:

an acquisition unit that acquires status information indicating a status of a queue for storing in the switching device at least communication data from the out-of-vehicle communication device; and a control unit that determines restriction of transmission of communication data from the external device to the out-of-vehicle communication device based on the status information acquired by the acquisition unit, wherein the status of the queue includes a throughput of communication data to be stored in the queue, the acquisition unit further acquires transmission information concerning transmission of communication data from the external device to the out-of-vehicle communication device, the transmission information being transmitted from the external device to the out-of-vehicle communication device, the control unit determines the restriction based on the status information and the transmission information that are acquired by the acquisition unit, and the transmission information includes at least one of a transmission amount of the communication data to be transmitted by the external device or an allowable delay time for the communication data to be transmitted by the external device.

2. The communication control device according to claim 1, wherein the status of the queue includes a free status in the queue.

3. The communication control device according to claim 1, wherein the status of the queue includes a predicted value of the status.

4. A switching device comprising:

a switching unit that performs relay processing for relaying communication data from one of a plurality of function units provided in a vehicle to another one of the function units;

one or a plurality of queues storing the communication data;

an acquisition unit that acquires status information indicating a status of the queue for storing at least communication data from an out-of-vehicle communication device being one of the function units and being capable of communicating with an external device outside the vehicle; and a control unit that determines restriction of transmission of communication data from the external device to the out-of-vehicle communication device based on the status information acquired by the acquisition unit, wherein the status of the queue includes a throughput of communication data to be stored in the queue, the acquisition unit further acquires transmission information concerning transmission of communication data from the external device to the out-of-vehicle communication device, the transmission information being transmitted from the external device to the out-of-vehicle communication device, the control unit determines the restriction based on the status information and the transmission information that are acquired by the acquisition unit, and the transmission information includes at least one of a transmission amount of the communication data to be transmitted by the external device or an allowable delay time for the communication data to be transmitted by the external device.

5. The switching device according to claim 4, wherein the status of the queue includes transmittability of communication data to be stored in the queue.

6. An out-of-vehicle communication device being one of a plurality of function units provided in a vehicle and being capable of communicating with an external device outside the vehicle, comprising:

an acquisition unit that acquires status information indicating a status of a queue for storing at least communication data from the out-of-vehicle communication device in a switching device being capable of relaying communication data from one of the function units to another one of the function units; and a control unit that determines restriction of transmission of communication data from the external device to the out-of-vehicle communication device based on the status information acquired by the acquisition unit, wherein the status of the queue includes a throughput of communication data to be stored in the queue, the acquisition unit further acquires transmission information concerning transmission of communication data from the external device to the out-of-vehicle communication device, the transmission information being transmitted from the external device to the out-of-vehicle communication device, the control unit determines the restriction based on the status information and the transmission information that are acquired by the acquisition unit, and the transmission information includes at least one of a transmission amount of the communication data to be transmitted by the external device or an allowable delay time for the communication data to be transmitted by the external device.

7. A communication control method for a communication control device used in an on-vehicle communication system including an out-of-vehicle communication device being one of a plurality of function units provided in a vehicle and being capable of communicating with an external device outside the vehicle and a switching device capable of relaying communication data from one of the function units to another one of the function units, comprising:

acquiring status information indicating a status of a queue for storing in the switching device at least communication data from the out-of-vehicle communication device; and determining restriction of transmission of communication data from the external device to the out-of-vehicle communication device based on the acquired status information, wherein the status of the queue includes a throughput of communication data to be stored in the queue, in the acquiring the status information, transmission information concerning transmission of communication data from the external device to the out-of-vehicle communication device is further acquired, the transmission information being transmitted from the external device to the out-of-vehicle communication device, in the determining the restriction, the restriction is determined based on the status information and the transmission information, and the transmission information includes at least one of a transmission amount of the communication data to be transmitted by the external device or an allowable delay time for the communication data to be transmitted by the external device.

8. A communication control method for a switching device including a switching unit performing relay processing for relaying communication data from one of a plurality of function units provided in a vehicle to another one of the function units and one or a plurality of queues storing the communication data, comprising:

acquiring status information indicating a status of the queue for storing at least communication data from an out-of-vehicle communication device being one of the function units and being capable of communicating with an external device outside the vehicle; and determining restriction of transmission of communication data from the external device to the out-of-vehicle communication device based on the acquired status information, wherein the status of the queue includes a throughput of communication data to be stored in the queue, in the acquiring the status information, transmission information concerning transmission of communication data from the external device to the out-of-vehicle communication device is further acquired, the transmission information being transmitted from the external device to the out-of-vehicle communication device, in the determining the restriction, the restriction is determined based on the status information and the transmission information, and the transmission information includes at least one of a transmission amount of the communication data to be transmitted by the external device or an allowable delay time for the communication data to be transmitted by the external device.

9. A communication control method for an out-of-vehicle communication device being one of a plurality of function units provided in a vehicle and being capable of communicating with an external device outside the vehicle, comprising:

acquiring status information indicating a status of a queue for storing at least communication data from the out-of-vehicle communication device in a switching device being capable of relaying communication data from one of the function units to another one of the function units; and determining restriction of transmission of communication data from the external device to the out-of-vehicle communication device based on the acquired status information, wherein the status of the queue includes a throughput of communication data to be stored in the queue, in the acquiring the status information, transmission information concerning transmission of communication data from the external device to the out-of-vehicle communication device is further acquired, the transmission information being transmitted from the external device to the out-of-vehicle communication device, in the determining the restriction, the restriction is determined based on the status information and the transmission information, and the transmission information includes at least one of a transmission amount of the communication data to be transmitted by the external device or an allowable delay time for the communication data to be transmitted by the external device.

10. A non-transitory computer readable recording medium storing a computer program for causing a computer to control a communication control device used in an on-vehicle communication system including an out-of-vehicle communication device being one of a plurality of function units provided in a vehicle and being capable of communicating with an external device outside the vehicle, and a switching device being capable of relaying communication data from one of the function units to another one of the function units, the computer program causing a computer to perform:

acquire status information indicating a status of a queue for storing in the switching device at least communication data from the out-of-vehicle communication device; and determine restriction of transmission of communication data from the external device to the out-of-vehicle communication device based on the acquired status information, wherein the status of the queue includes a throughput of communication data to be stored in the queue, in the acquiring the status information, transmission information concerning transmission of communication data from the external device to the out-of-vehicle communication device is further acquired, the transmission information being transmitted from the external device to the out-of-vehicle communication device, in the determining the restriction, the restriction is determined based on the status information and the transmission information, and the transmission information includes at least one of a transmission amount of the communication data to be transmitted by the external device or an allowable delay time for the communication data to be transmitted by the external device.

11. A non-transitory computer readable recording medium storing a computer program for causing a computer to control a switching device including a switching unit that performs relay processing for relaying communication data from one of a plurality of function units provided in a vehicle to another one of the function units and one or a plurality of queues storing the communication data, the computer program causing the computer to perform:
- acquire status information indicating a status of the queue for storing at least communication data from an out-of-vehicle communication device being one of the function units and being capable of communicating with an external device outside the vehicle; and
- determine restriction of transmission of communication data from the external device to the out-of-vehicle communication device based on the status information acquired by the acquisition unit,
- wherein the status of the queue includes a throughput of communication data to be stored in the queue,
- in the acquiring the status information, transmission information concerning transmission of communication data from the external device to the out-of-vehicle communication device is further acquired, the transmission information being transmitted from the external device to the out-of-vehicle communication device,
- in the determining the restriction, the restriction is determined based on the status information and the transmission information, and
- the transmission information includes at least one of a transmission amount of the communication data to be transmitted by the external device or an allowable delay time for the communication data to be transmitted by the external device.

12. A non-transitory computer readable recording medium storing a computer program for causing a computer to control communication control program used for an out-of-vehicle communication device being one of a plurality of function units provided in a vehicle and being capable of communicating with an external device outside the vehicle, the computer program causing a computer to perform:
- acquire status information indicating a status of a queue for storing at least communication data from the out-of-vehicle communication device in a switching device being capable of relaying communication data from one of the function units to another one of the function units, and
- determine restriction of transmission of communication data from the external device to the out-of-vehicle communication device based on the status information acquired by the acquisition unit,
- wherein the status of the queue includes a throughput of communication data to be stored in the queue,
- in the acquiring the status information, transmission information concerning transmission of communication data from the external device to the out-of-vehicle communication device is further acquired, the transmission information being transmitted from the external device to the out-of-vehicle communication device,
- in the determining the restriction, the restriction is determined based on the status information and the transmission information, and
- the transmission information includes at least one of a transmission amount of the communication data to be transmitted by the external device or an allowable delay time for the communication data to be transmitted by the external device.

* * * * *